United States Patent
Zhou et al.

(10) Patent No.: US 12,291,117 B1
(45) Date of Patent: May 6, 2025

(54) ELECTRIC VEHICLE CHARGE ROBOT PLUG IN MECHANISM

(71) Applicant: Procom Engineering, Inc., Aliso Viejo, CA (US)

(72) Inventors: Wesley Zhou, Aliso Viejo, CA (US); Ritzo Muntinga, Carlsbad, CA (US)

(73) Assignee: Procom Engineering, Inc., Aliso Viejo, CA (US)

( * ) Notice: Subject to any disclaimer, the term of this patent is extended or adjusted under 35 U.S.C. 154(b) by 0 days.

(21) Appl. No.: 19/019,818

(22) Filed: Jan. 14, 2025

(51) Int. Cl.
| | |
|---|---|
| *H02J 7/00* | (2006.01) |
| *B60L 53/16* | (2019.01) |
| *B60L 53/37* | (2019.01) |
| *H01R 13/631* | (2006.01) |

(52) U.S. Cl.
CPC ............... *B60L 53/37* (2019.02); *B60L 53/16* (2019.02); *H01R 13/631* (2013.01); *H01R 2201/26* (2013.01); *H02J 7/0042* (2013.01)

(58) Field of Classification Search
None
See application file for complete search history.

(56) References Cited

U.S. PATENT DOCUMENTS

| | | | | |
|---|---|---|---|---|
| 6,431,912 B1 * | 8/2002 | Mori | .................. | H01R 13/2421 439/587 |
| 9,056,555 B1 | 6/2015 | Zhou | | |
| 10,644,442 B2 * | 5/2020 | Moseke | .................. | B60L 53/30 |
| 11,196,217 B2 * | 12/2021 | Tremblay | ............... | H01R 43/20 |
| 11,287,026 B2 * | 3/2022 | Umeki | .................. | B60K 6/445 |
| 2006/0223354 A1 * | 10/2006 | Hafele | .................. | F02P 19/028 439/352 |
| 2008/0238365 A1 * | 10/2008 | Kaneko | ................. | H01M 10/46 320/109 |
| 2010/0315040 A1 * | 12/2010 | Sakurai | .................. | B60L 53/20 320/109 |
| 2013/0187601 A1 * | 7/2013 | Petrie | ................... | H01R 13/635 320/109 |
| 2013/0224973 A1 * | 8/2013 | Midy | ................. | H01R 13/4361 425/542 |
| 2019/0217729 A1 * | 7/2019 | Rönfanz | ................ | H01R 4/307 |
| 2019/0217730 A1 * | 7/2019 | Götz | ..................... | H01R 13/506 |
| 2020/0262368 A1 * | 8/2020 | Lunde | .................... | H01R 12/53 |
| 2023/0373323 A1 | 11/2023 | Zhou et al. | | |
| 2023/0373333 A1 | 11/2023 | Zhou et al. | | |
| 2024/0101072 A1 * | 3/2024 | Anderson | ................ | B60S 1/52 |

\* cited by examiner

*Primary Examiner* — Arun C Williams
(74) *Attorney, Agent, or Firm* — Georgiy L. Khayet

(57) ABSTRACT

An apparatus for charging electric vehicles is provided. The apparatus includes a housing, a sleeve extending from the housing, a first nozzle assembly designed to move inside the sleeve and to engage a charging port of an electric vehicle, and a second nozzle assembly designed to move inside the sleeve independently of the first nozzle assembly. The second nozzle assembly has a recess for receiving a locking pawl of the charging port. The second nozzle assembly is designed to be fully inserted into the charging port before the first nozzle assembly is fully inserted into the charging port. The recess receives the locking pawl after the ground pin engages the inlet ground pin. The first nozzle assembly is designed to be fully inserted into the charging port after the locking pawl is secured inside the recess of the second nozzle assembly.

20 Claims, 34 Drawing Sheets

ELECTRIC VEHICLE CHARGE ROBOT PLUG IN MECHANISM

TECHNICAL FIELD

The subject disclosure relates to methods and apparatus for robotically charging electric vehicles and, more particularly, to an apparatus which facilitates the establishment of electrical connection between a robot charging connector and a charging socket of an electrically powered vehicle.

BACKGROUND

Robotic electric vehicle charging apparatuses are systems designed to autonomously charge electric vehicles without human intervention. These systems typically utilize robotic technology to automate the process of connecting an electric vehicle to a power source, ensuring efficient, accurate, and hassle-free charging. They are particularly valuable for public charging stations, fleet depots, and autonomous vehicles that may not have operators available to manually plug in chargers.

There are known robotic vehicle charging apparatuses. A robotic vehicle charging apparatus is described, for example, in U.S. Pat. No. 9,056,555 entitled "Vehicle Charge Robot," the subject matter of which is incorporated herein by reference in its entirety for all purposes. Another robotic charging apparatus is further described in U.S. patent application Ser. No. 17/748,672, filed on May 19, 2022, and Ser. No. 17/962,418 filed on Oct. 7, 2022, both entitled "Charging Port Alignment and Interconnection Methods and Apparatus for Robotic Car Chargers." The subject matter of the aforementioned applications is incorporated herein by reference in its entirety for all purposes.

One of the challenges faced in robotic vehicle charging is ensuring a secure and reliable mechanical connection between the charging pins and the charging port of an electric vehicle to facilitate efficient energy transfer while maintaining safety standards. Loose or improper connections can result in arcing, overheating, or even electrical fires, posing a safety risk for the vehicle and the charging apparatus.

Some existing robotic charging apparatuses use vacuum or suction mechanisms to hold and guide the charging pins in the charging port. However, while suction devices can create a temporary hold, their reliability is often compromised by external factors such as dust, debris, uneven surfaces, as well as wear and tear of seals over time. This can lead to frequent connection failures or the inability to maintain a firm grip on the charging pins. Other existing robotic charging apparatuses use magnetic devices to align and secure charging pins to the port by using magnetic force. However, magnetic devices can face limitations due to the inconsistent magnetic field strength, misalignment of the magnets, and interference from metal objects nearby. Additionally, some electric vehicles designs may not be suitable for the use of magnets. Accordingly, there is a need for solutions that incorporate robust mechanical locking, enhanced precision, adaptability, and safety mechanisms to ensure a consistently secure connection between charging pins and charging ports of electric vehicles.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

Generally, the present disclosure is directed to technology for methods and apparatus for charging electric vehicles. Specifically, embodiments of the present disclosure may facilitate the establishment of electrical connection between a robot charging connector and a charging socket of an electrically powered vehicle. According to some embodiments of the present disclosure, computer vision can be employed to align the charging connector with the vehicle's charging port. Electric vehicles may include, inter alia, vehicles powered in whole or in part by one or more electric motors or other electric powered means.

According to one example embodiment of the present disclosure, an apparatus for charging electrical vehicles is provided. The apparatus may include a housing and a sleeve extending from the housing. The apparatus may include a first nozzle assembly designed to move inside the sleeve and to engage a charging port of an electric vehicle. The first nozzle assembly may include a ground pin engageable with an inlet ground pin of the charging port. The apparatus may also include a second nozzle assembly designed to move inside the sleeve independently of the first nozzle assembly. The second nozzle assembly may have a recess for receiving a locking pawl of the charging port. The second nozzle assembly can be designed to be fully inserted into the charging port before the upper nozzle assembly reaches the charging port, such that the locking pawl is secured inside the recess of the lower nozzle assembly is fully inserted into the charging port. The recess of the second nozzle assembly can receive the locking pawl after the ground pin of the first nozzle assembly engages the inlet ground pin of the charging port. The first nozzle assembly can be designed to be fully inserted into the charging port after the locking pawl is secured inside the recess of the second nozzle assembly.

The first nozzle assembly may include a first charging pin and a second charging pin for establishing a connection with the charging port. The second nozzle assembly may include a proximity pin and a communication pin for engaging with the charging port. The first nozzle assembly may include a first cavity designed to receive the first charging pin, a second cavity designed to receive the second charging pin, and a third cavity designed to receive the ground pin. The second nozzle assembly and the first nozzle assembly can be designed to rotate with the sleeve about an axis of rotation of the sleeve. The apparatus may include a camera holder disposed inside the sleeve and restricted from moving along the sleeve and a computer vision camera mounted onto the camera holder.

The apparatus may also include a first connector pusher designed to move the first nozzle assembly inside the sleeve and a second connector pusher designed to move the second nozzle assembly inside the sleeve. The apparatus may include a first tie rod connected to the first connector pusher via a first ball joint and a second tie rod connected to the second connector pusher via a second ball joint. The apparatus may also include a swivel ring engaging the first tie rod and the second tie rod. A rotation of the swivel ring in the first direction can cause the second connector pusher to move inside the sleeve, thereby moving the second nozzle assembly towards the charging port. After the locking pawl is secured inside the recess of the second nozzle assembly, a rotation of the swivel ring in a second direction can cause the first connector pusher to move inside the sleeve, thereby moving the first nozzle assembly towards the charging port.

The swivel ring can be designed to rotate around an axis of the sleeve and around a further axis, the further axis being orthogonal to the axis of the sleeve. The swivel ring may include a first swivel ring half and a second swivel ring half. The housing may include a first housing half and a second housing half.

According to another embodiment of the present disclosure, a method for manufacturing an apparatus for charging electrical vehicles is provided. The method can include providing a housing and a sleeve extending from the housing. The method may include providing a first nozzle assembly designed to move inside the sleeve and to engage a charging port of an electric vehicle. The first nozzle assembly may include a ground pin engageable with an inlet ground pin of the charging port. The method may include providing a second nozzle assembly designed to move inside the sleeve independently of the first nozzle assembly. The second nozzle assembly may have a recess for receiving a locking pawl of the charging port. The second nozzle assembly can be designed to be fully inserted into the charging port before the first nozzle assembly is fully inserted into the charging port. The recess of the second nozzle assembly receives the locking pawl after the ground pin of the first nozzle assembly engages the inlet ground pin of the charging port. The first nozzle assembly can be designed to be fully inserted into the charging port after the locking pawl is secured inside the recess of the second nozzle assembly.

Other example embodiments of the disclosure and aspects will become apparent from the following description taken in conjunction with the following drawings.

BRIEF DESCRIPTION OF DRAWINGS

Exemplary embodiments are illustrated by way of example and not limitation in the figures of the accompanying drawings, in which like references indicate similar elements.

DETAILED DESCRIPTION

Figure 1:
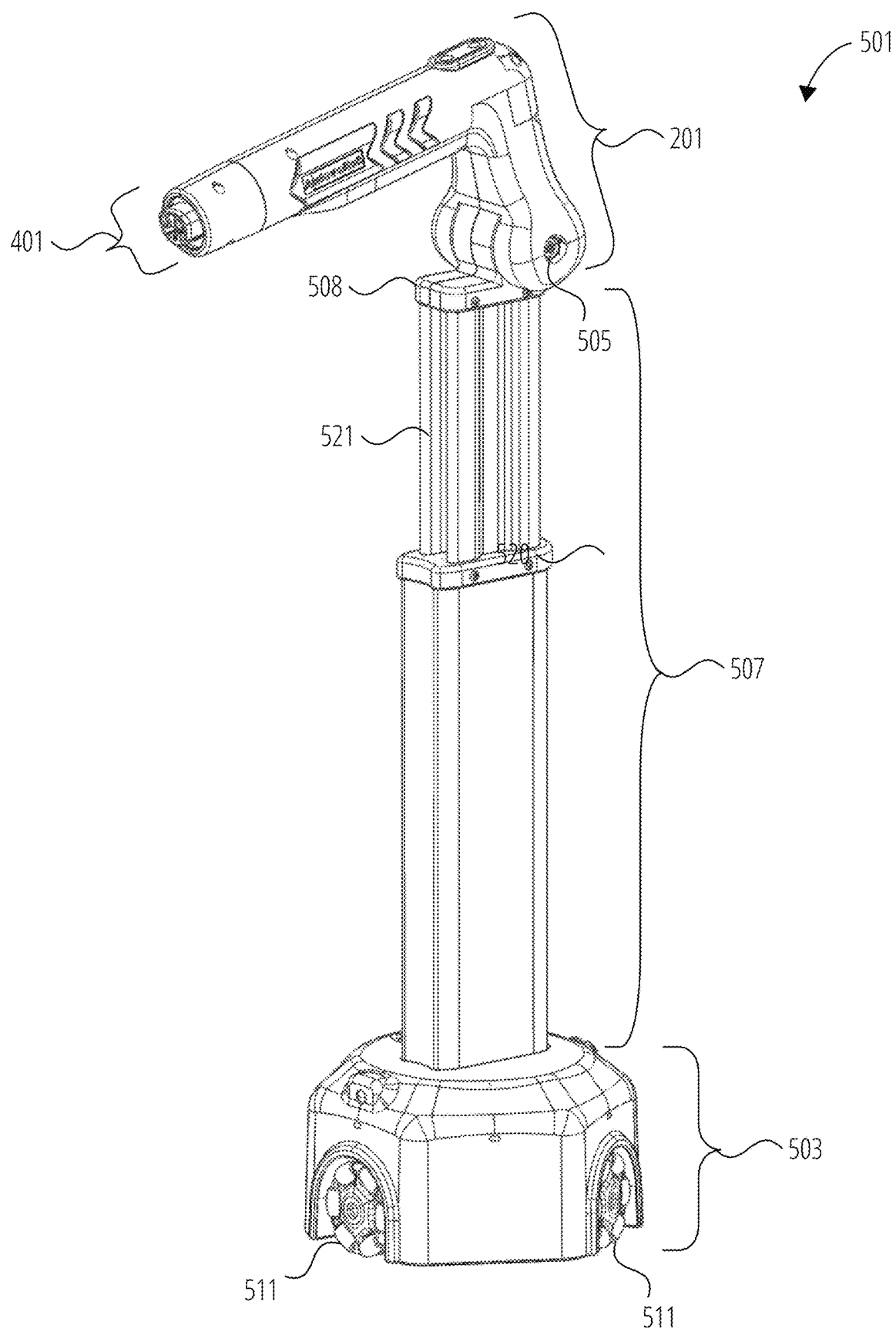
FIG. 1 is a perspective view of a vehicle charging robot, according to an example embodiment.

The following detailed description of embodiments includes references to the accompanying drawings, which form a part of the detailed description. Approaches described in this section are not prior art to the claims and are not admitted to be prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and operational changes can be made without departing from the scope of what is claimed. The following detailed description is, therefore, not to be taken in a limiting sense, and the scope is defined by the appended claims and their equivalents.

Generally, the embodiments of this disclosure relate to methods and apparatuses for charging electric vehicles. According to an example embodiment, a charging robot is provided. The charging robot includes a charging nozzle assembly mounted to move in and out with respect to a housing and a computer vision camera mounted with respect to the charging nozzle assembly in order to monitor the charging port of the electric vehicle. A first motor is configured to rotate the charging nozzle assembly and camera, while a second motor is configured to extend or retract the charging nozzle assembly with respect to the charging port of the electric vehicle.

The charging nozzle assembly is split into two parts, specifically, a second nozzle assembly and a first nozzle assembly. The second nozzle assembly includes communication pins for communications between a charging robot and an electric vehicle. The second nozzle assembly has a recess (also referred to herein as a locking pawl cavity) allowing the electric vehicle to engage the second nozzle assembly with a locking pawl. The second nozzle assembly can be inserted into the charging port of the electric vehicle using a force of small magnitude. The first nozzle assembly includes the charging and grounding pins which typically require a stronger force for insertion.

The second nozzle assembly can move inside the charging port ahead of the first nozzle assembly. The movement between the second nozzle assembly and the first nozzle assembly can be mechanically synchronized such that after inserting the second nozzle assembly and slightly moving the first nozzle assembly, the electric vehicle can engage the locking pawl. After the locking pawl is engaged, the larger forces required to insert the first nozzle assembly will be pushing against the locking pawl.

According to some embodiments of the present disclosure, the charging robot includes an electrical connector including an array of receptacles configured to receive and establish electrical connection with respective mating connectors of a vehicle's charging port. A camera is located within the array of receptacles, the camera being positioned to generate an electronic image of the vehicle's charging port and features within the charging port such as mating electrical connection pins or receptacles.

According to some embodiments of the present disclosure, the charging robot includes an outer arm housing. The first nozzle assembly and second nozzle assembly are mounted to move in and out with respect to the outer arm housing. A computer vision camera is mounted with respect to the first nozzle assembly and second nozzle assembly in order to monitor the charging port of the electric vehicle when the first nozzle assembly and second nozzle assembly are in the initial retracted position.

The first nozzle assembly and second nozzle assembly are connected to each other by means of a swiveling ring that pivots around a horizontal axis. The horizontal axis is perpendicular to the centerline through the charging nozzle assembly. The first nozzle assembly is connected to the swivel ring through a tie rod with a ball joint connection on each end to enable movement of the joint in all three axes. The second nozzle assembly is also connected to the swivel ring using a similar tie rod with ball joints on either end. When the swivel ring swivels around its axis, it changes the relative position between the first nozzle assembly and the second nozzle assembly in a horizontal plane parallel to the axis through the charging nozzle assembly and the charging port of the electric vehicle.

The first motor and the second motor can be mounted in a slide housing. The first motor is configured to rotate the charging nozzle assembly through an arc about a central axis. The second motor is configured to ride forward and back on a fixed threaded screw such that when the second motor is actuated, the charging nozzle assembly is extended toward the charging port of the vehicle. The forward end of the slide housing allows for two round holes along the horizontal axis perpendicular to the center axis of the charging nozzle assembly. The swivel ring is mounted in two round holes having freedom of movement along the horizontal axis.

The swivel ring is equipped with an actuation arm extension facing forward. The actuation arm includes, at the end, a pin and roller that rides in a track having a shape of curved cavity. The track is initially oriented parallel to the nozzle center axis, then the track is shaped upward, and then it is shaped downward again toward the center axis of charging nozzle assembly. The track is formed in the inside surface of the outer arm housing for the charging nozzle assembly and the slide housing. The second motor drives the slide housing forward and back inside the outer arm housing, and the shape of the track causes the swivel ring to rotate along its axis, causing the second nozzle assembly to extend out of the outer arm housing more than the first nozzle assembly.

According to one example embodiment, the second nozzle assembly is moved to engage the charging port and because the second nozzle assembly includes only two small terminal pins to engage charging port, the second nozzle assembly does not have much resistance while moving inside the charging port. This enables a low weight free standing robot to provide the force required for insertion of second nozzle assembly into the charging port of electric vehicle. After the second nozzle assembly is fully inserted and its recess (locking pawl cavity) is located above the locking pawl in the vehicle charging port, the first nozzle assembly moves toward the vehicle charging port. As soon as the ground pin located in the first nozzle assembly touches the corresponding pin in the charging port, an electric circuit is completed, and the electric vehicle engages the locking pawl to lock the second nozzle assembly to the vehicle charging port. When the second motor keeps driving the first nozzle assembly forward, the reaction force of the motor torque will be between the first nozzle assembly and second nozzle assembly. Because the second nozzle assembly is now locked by the locking pawl, the complete light weight charging robot will remain stationary even as a large insertion force is generated by the second motor to insert the charging terminal pins and ground terminal pin into the vehicle charging connector.

According to one example embodiment, the arc of rotation of the first motor may be +/−12 degrees with respect to the central axis of the charging nozzle assembly but may be of different ranges in other embodiments. In one example embodiment, the thread of the screw on the second motor is an ACME thread but may be of other thread types in other embodiments.

In one example embodiment, the charging nozzle assembly is positioned within a cylindrical sleeve comprising a cavity which positions and supports the computer vision camera. In one example embodiment, the sleeve may have a lip formed around a rear circumference thereof which is configured to engage a slot in a surrounding outer arm housing to prevent the sleeve from moving horizontally, while allowing the sleeve to rotate along with the computer vision camera in response to rotation imparted by the first motor.

According to an example embodiment, a method of interconnecting a vehicle charging connector with a charging port of a vehicle is provided. The method includes providing a charging nozzle assembly which is split into two main parts: a first nozzle assembly including main charging and ground terminal connector terminal pins, and a second nozzle assembly containing the low voltage communication connector terminal pins. The second nozzle assembly also includes a downward facing recess which interfaces with a locking pawl in the electric vehicle charging port. The first nozzle assembly and second nozzle assembly of the charging nozzle assembly can slide independently of each other in a mostly horizontal plane, parallel to each other, into the charging port of the electric vehicle.

Any of the embodiments described above may further include methods or apparatus for aligning pins and receptacles of a vehicle charging port to mate with pins and receptacles of a robot charging plug comprising positioning a camera to view the vehicle charging port and to generate an image of the charging port. The embodiments described above may further include employing computer vision software to use the image to determine an offset between one of the pins and one or more of the receptacles and to generate one or more motor control signals and may further comprise employing one or more motor control signals to correct the offset.

Referring now to the drawings, various embodiments are described in which reference numerals represent like parts and assemblies throughout the several views. It should be noted that the reference to various embodiments does not limit the scope of the claims attached hereto. Additionally, any examples outlined in this specification are not intended to be limiting and merely set forth some of the many possible embodiments for the appended claims.

FIG. 1 is a perspective view of a vehicle charging robot 501, according to an example embodiment. As shown in FIG. 1, charging robot 501 includes a base 503, a mast 507, and a nozzle arm assembly 201. The mast 507 includes an outer mast extrusion 520, an inner mast extrusion 521, and a mast head 508. The nozzle arm assembly 201 includes charging nozzle assembly 401 and an elbow joint 505. The base includes wheels 511.

Figure 2:
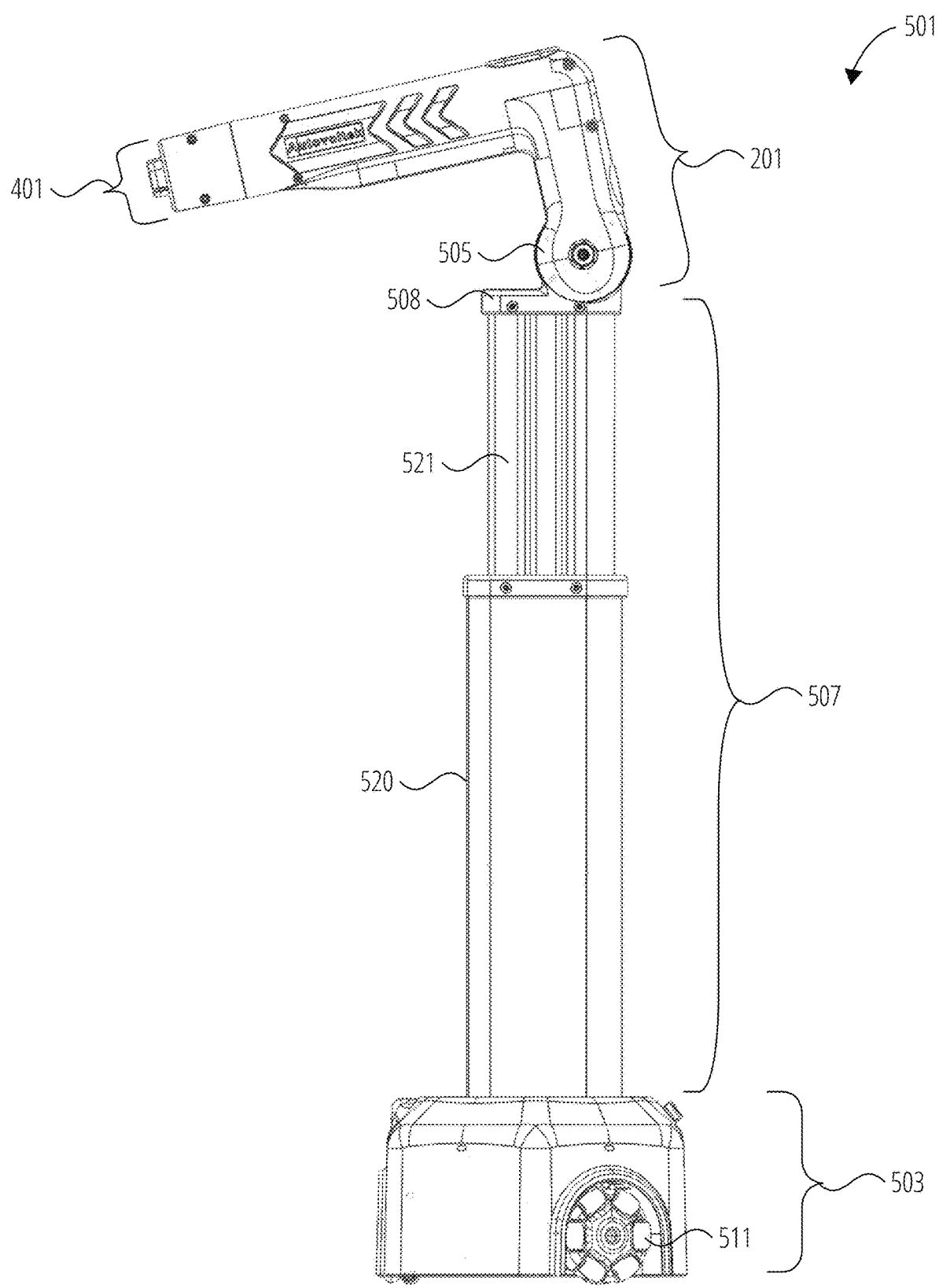
FIG. 2 is a side view of the robot of FIG. 1, according to an example embodiment.

FIG. 2 is a side view of the charging robot 501 shown in FIG. 1. FIG. 2 depicts the following components of the charging robot 501: an outer mast extrusion 520, an inner mast extrusion 521, a mast head 508, a nozzle arm assembly 201, a charging nozzle assembly 401, an elbow joint 505, a mast 507, a base 503, a wheel 511.

The base 503 includes three rotatably mounted omni wheels, configured as part of a "Kiwi" drive system with the three wheels 511 located 120 degrees apart and capable of moving the charging robot 501 in any direction in a horizontal X-Y plane tangent to the wheels 511.

Figure 5:
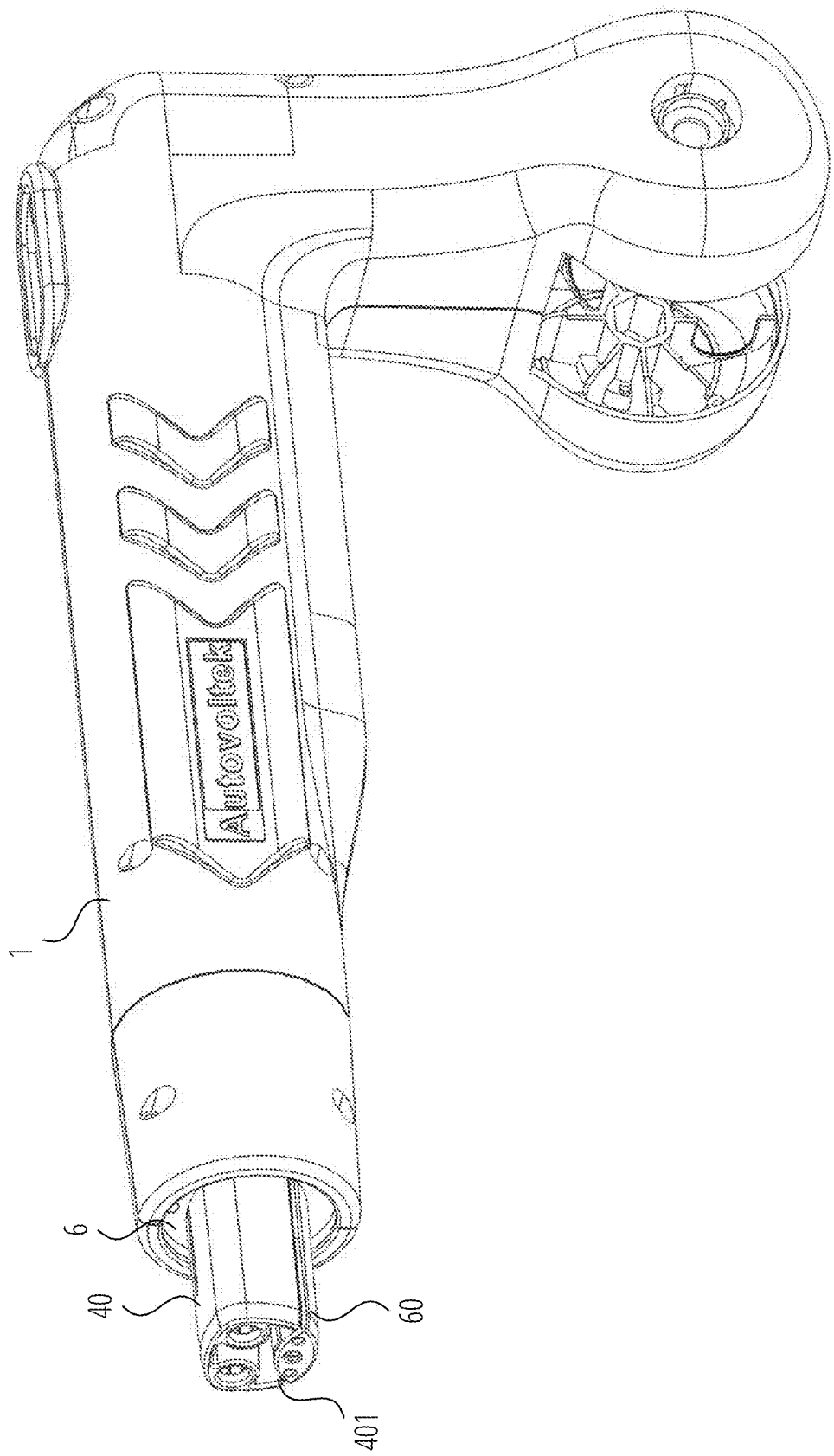
FIG. 5 is a perspective view of a nozzle arm assembly of the robot of FIG. 1, according to an example embodiment.
Figure 14:
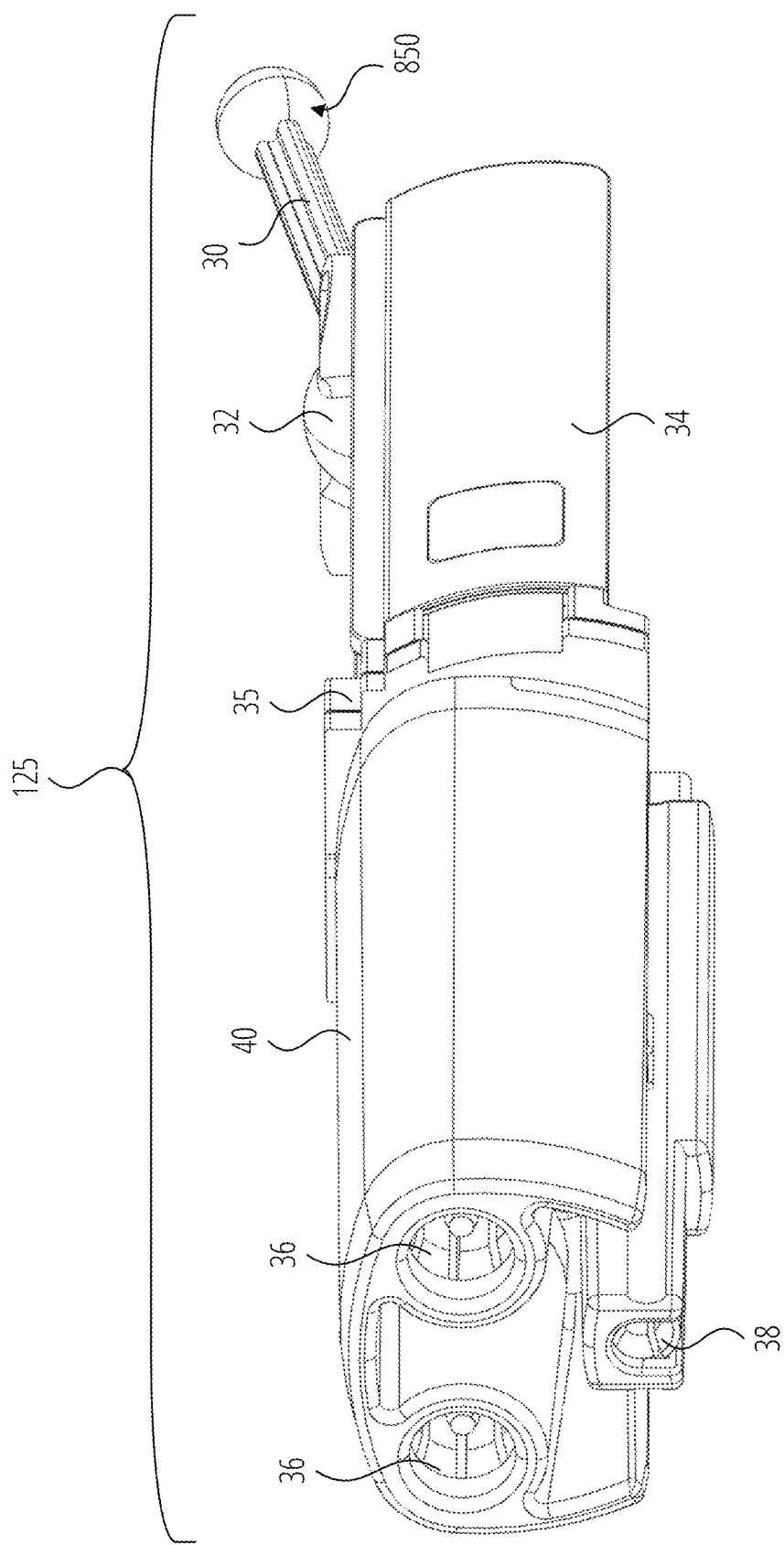
FIG. 14 is a perspective view of a first nozzle assembly disposed inside the nozzle arm assembly of FIG. 5, according to an example embodiment.

The charging robot 501 includes a nozzle arm assembly 201 (also shown in FIG. 5 and FIG. 6), which includes the extending charging nozzle assembly 401 comprising of a second assembly 112 (shown in FIG. 15) and a first assembly 125 (shown FIG. 14). The charging nozzle assembly 401 is also shown in FIG. 5 in an extended position at which charging nozzle assembly 401 is extending out of nozzle sleeve 6 (shown in FIG. 5). The extending charging nozzle assembly 401 can be engaged with the charging port 131 (shown in FIG. 21) as described in further detail below.

The mast 507 shown in FIG. 1 and FIG. 2 (and also shown in FIG. 3 and FIG. 4) includes an outer mast extrusion 520 and an inner mast extrusion 521 designed such that the inner mast extrusion 521 may slide up and down vertically with respect to the outer mast extrusion 520.

Figure 3:
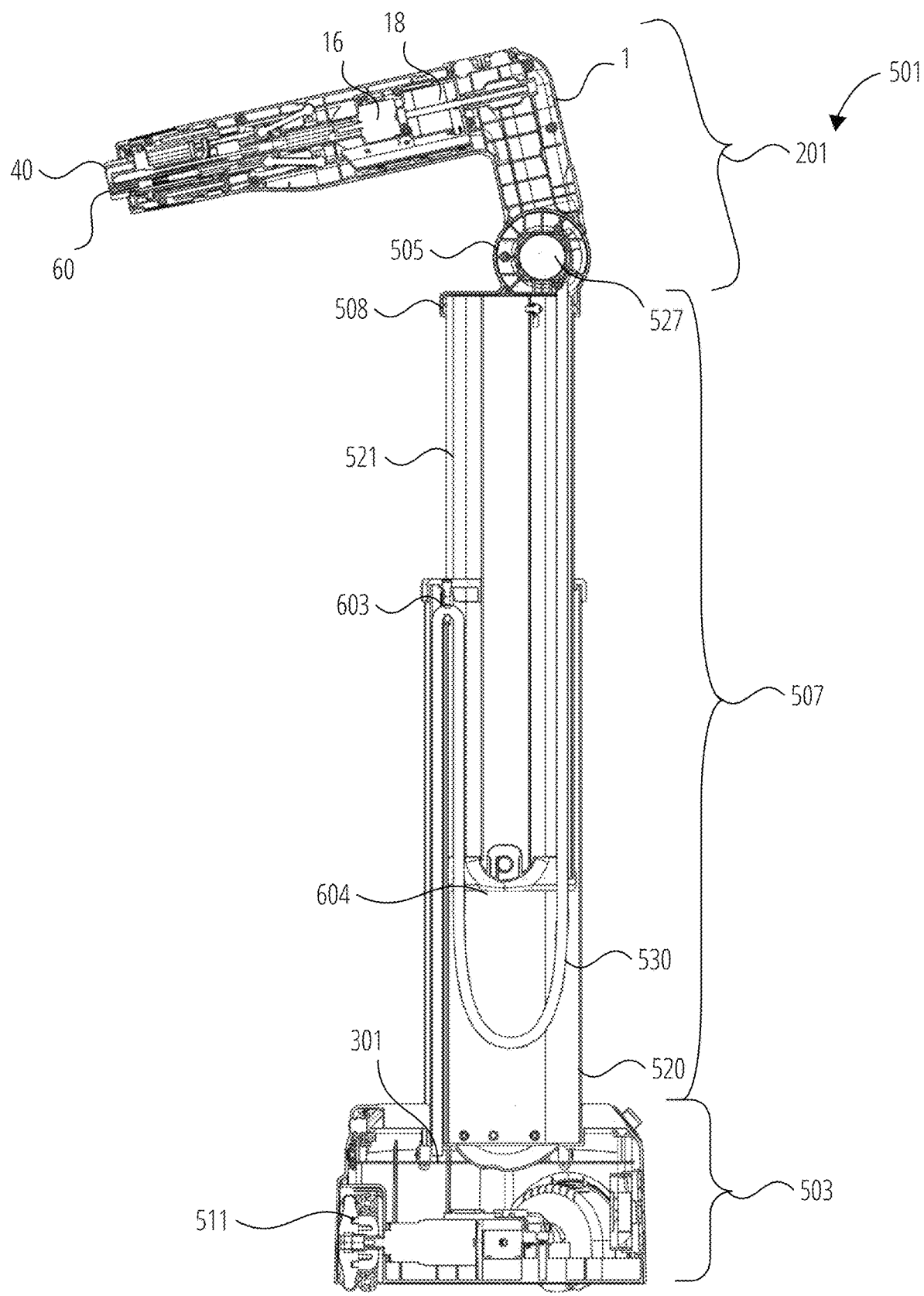
FIG. 3 is a side sectional view showing the cable routing inside the mast of the robot of FIG. 1, according to an example embodiment.

FIG. 3 is a side sectional view showing the cable routing inside mast 507 of the charging robot 501 of FIG. 1. FIG. 3 depicts the following components of charging robot 501: a mast 507, a base 503, outer mast extrusion 520, an inner mast extrusion 521, a mast head 508, a nozzle arm assembly 201, an elbow joint 505, a wheel 511, a first nozzle assembly 40, a second nozzle assembly 60, a rotation motor 16, a linear slide drive motor 18, a housing 1, an elbow motor 527, a bottom cap 604, and an electrical cabling 530.

Figure 4:
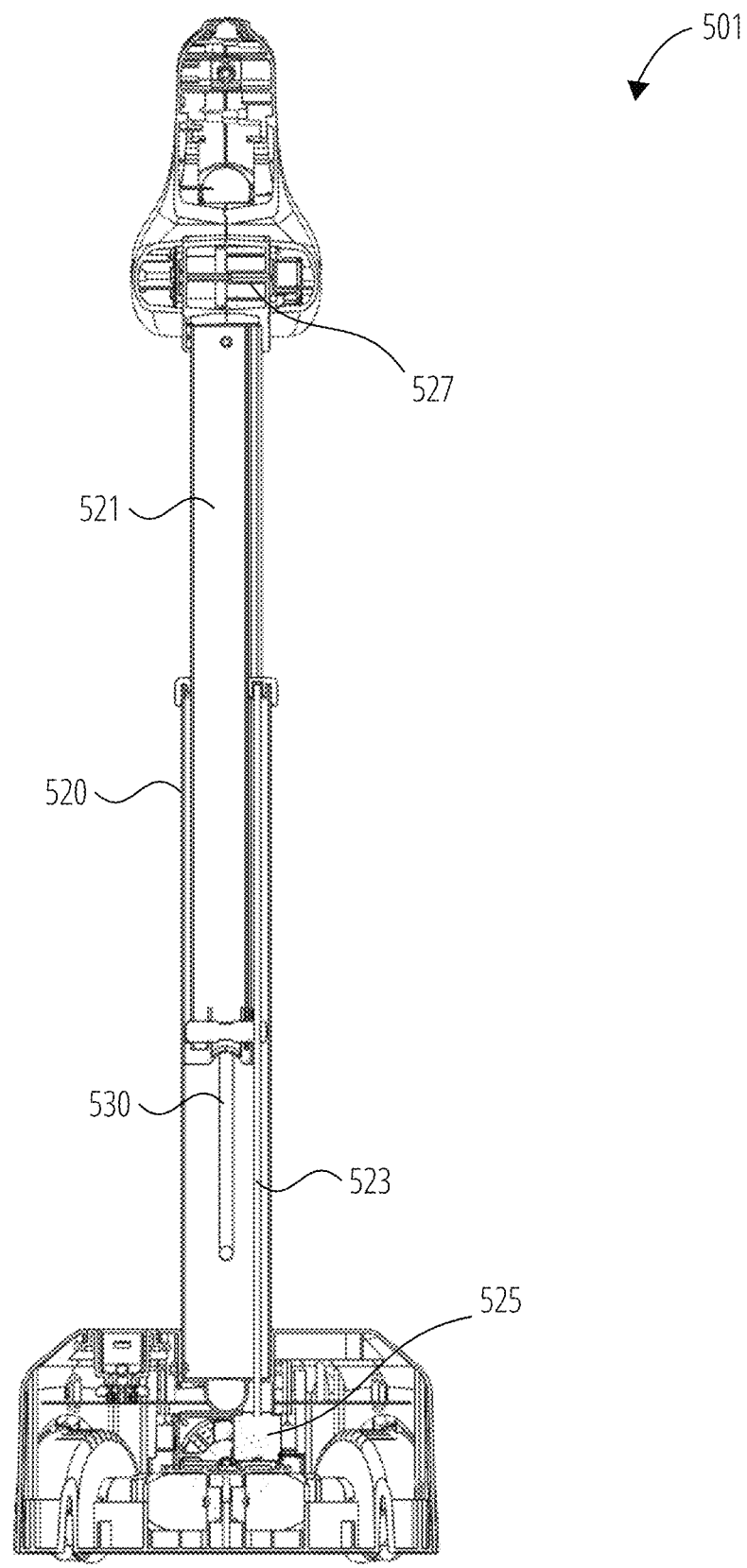
FIG. 4 is a frontal sectional view illustrating a drive mechanism for raising and lowering an inner mast of the robot of FIG. 1, according to an example embodiment.

FIG. 4 is a frontal sectional view illustrating a drive mechanism for raising and lowering the inner mast extrusion 521 of the robot of FIG. 1. FIG. 4 depicts the following components of charging robot 501: an outer mast extrusion 520, an inner mast extrusion 521, an elbow motor 527, an electrical cabling 530, a jack screw 523, and a motor 525.

Electrical cabling 530 inside the mast 507 is anchored at a circular cavity 301, runs up around point 603, then down and around a bottom cap 604 of the inner mast extrusion 521, and up and into housing 1 to provide power to the charging nozzle assembly 401 and to the three motors 527, 16, 18. The electrical cabling 530 can be a flex sleeve and carry four electrical conductor cables inside. The elbow motor 527 (shown in FIG. 3) rotates the elbow joint 505 about a horizontal axis to assist in bringing the charging nozzle assembly 401 in line with a charging port 131 of an electric vehicle. An example charging port 131 is shown in FIG. 21-FIG. 27, which in one embodiment, may comprise a Society of Automotive Engineers (SAE) standard for North American Charging System (NACS) socket.

The electrical cabling 530 may terminate in base 503 at a main relay for the charging robot 501. The base 503 may also contain the main computer or controller for the charging robot 501, 24V, 12V and 5V DC power supplies, motor controllers for the motors 527, 16, 18, circuitry for six optical collision avoidance sensors that are located on each side of the octagonal base 503, and a camera for "ground" navigation of charging robot 501. Power to the robot can be supplied by a NACS charging port located on base 503.

In an example embodiment, a jack screw 523 driven by motor 525 moves the inner mast extrusion 521 vertically up and down in the Z axis, as shown in FIG. 4.

FIG. 5 is a perspective view of nozzle arm assembly 201 of the charging robot 501 of FIG. 1. FIG. 5 depicts the following components: a housing 1, a first nozzle assembly 40, a second nozzle assembly 60, and a nozzle sleeve 6.

Figure 6:
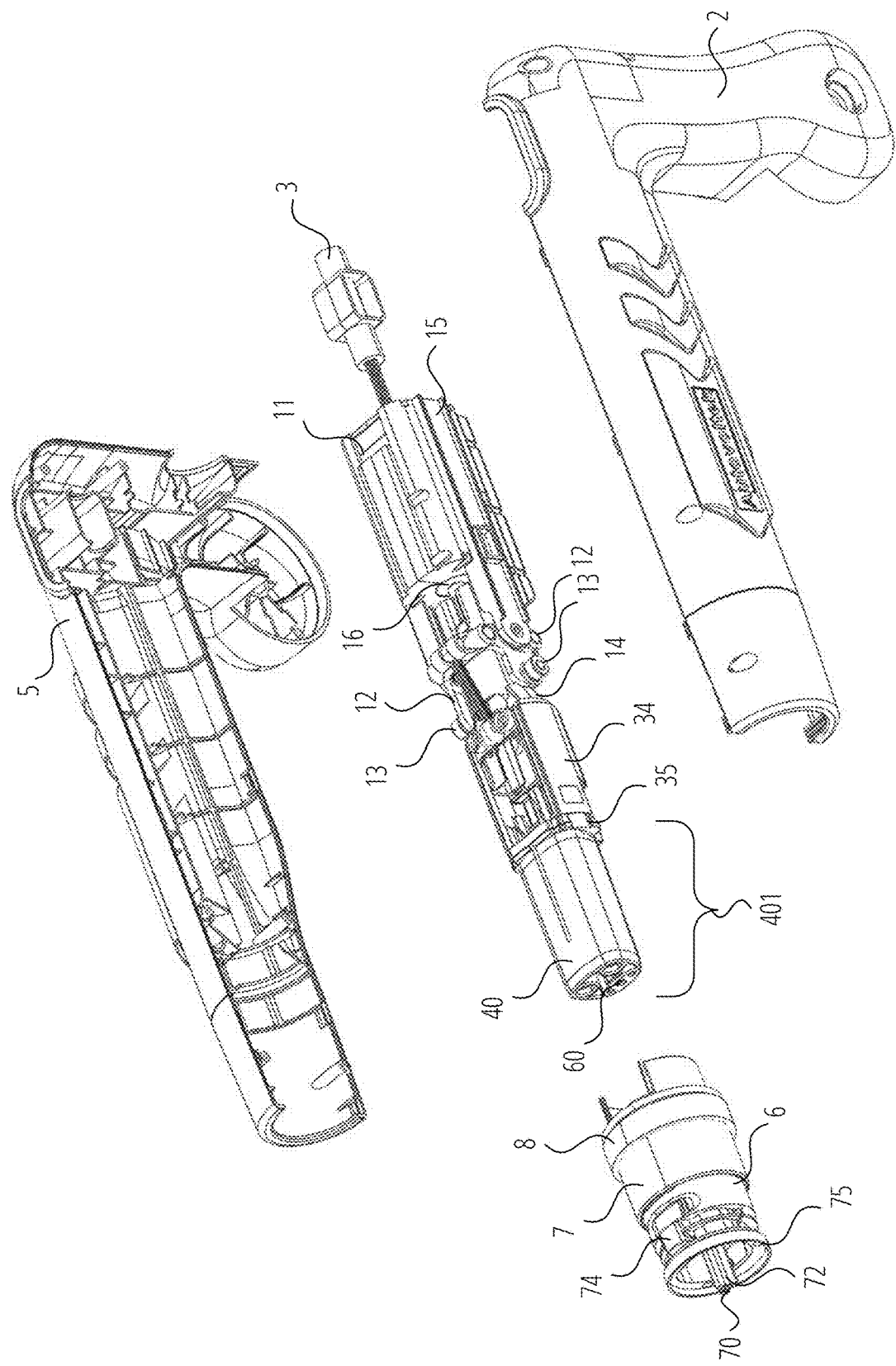
FIG. 6 is a partially exploded view of nozzle arm assembly 201 of FIG. 5, according to an example embodiment.

FIG. 6 is a partially exploded view of nozzle arm assembly 201 of FIG. 5. FIG. 6 depicts the following components: charging nozzle assembly 401, a first nozzle assembly 40, a second nozzle assembly 60, a rotation motor 16, a housing half 5, a housing half 2, a nozzle sleeve 6, a linear drive nut holder 3, a rubber ring mount 8, an axial slide housing half 11, a swivel ring half 12, a rotation adapter sleeve 14, an upper clip 74, a camera holder 72, an LED light printed circuit board 75, a pin pusher 35, a first nozzle pusher 34, rollers 13, an axial slide housing half 15, a nozzle bearing ring 7, and a computer vision camera 70. It should be noted that wiring inside the nozzle arm assembly 201 has been omitted in FIG. 6 and following figures for clarity.

As shown in FIG. 5 and FIG. 6, the nozzle arm assembly 201 consists of housing 1 formed by housing half 5 a housing half 2. Housing half 5 and housing half 2 are attached together to mast head 508. Mast head 508 contains an elbow motor 527 enabling the nozzle arm assembly 201 to rotate around a horizontal axis to align the nozzle arm assembly 201 with the charging port 131 of electric vehicle.

Housing 1 formed by housing half 5 and housing half 2 contains nozzle sleeve 6. Nozzle sleeve 6 can rotate along a longitudinal axis but is fixed axially to housing half 5 and housing half 2 using circular ribs along with nozzle bearing ring 7 and rubber ring mount 8. Nozzle sleeve 6 also contains computer vision camera 70 and camera holder 72. Camera holder 72 is fixed attached to nozzle sleeve 6 and located by upper clip 74, which means that computer vision camera 70 rotates together with nozzle sleeve 6 but does not move axially along the longitudinal axis as it is fixed to nozzle sleeve 6.

Figure 7:
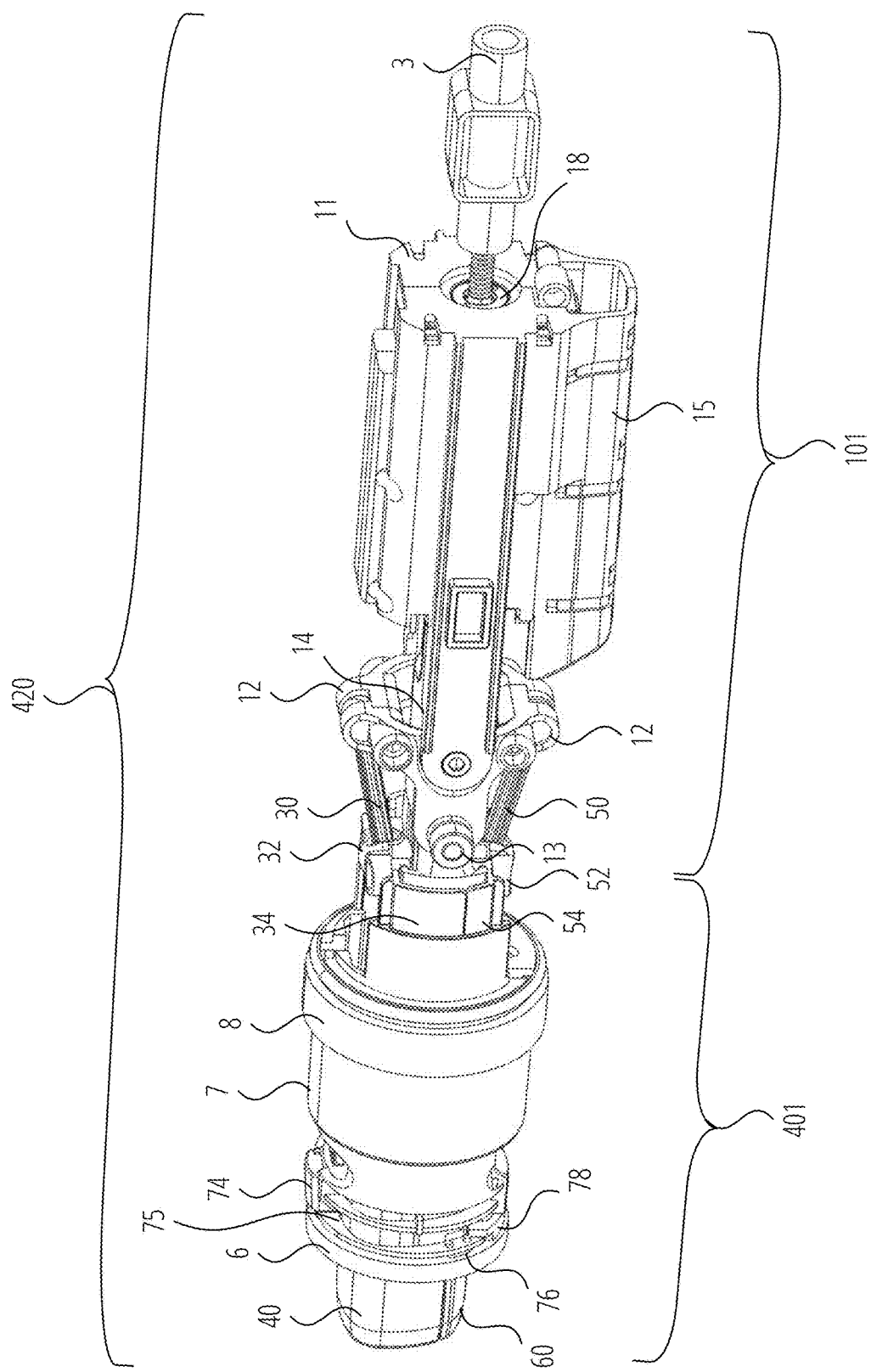
FIG. 7 is a side perspective view of the mechanical assembly located inside the nozzle arm assembly of FIG. 5, according to an example embodiment.

FIG. 7 is a side perspective view of the mechanical assembly 420 located inside nozzle arm assembly 201 of FIG. 5, according to an example embodiment. Mechanical assembly 420 includes charging nozzle assembly 401 and a linear sliding assembly 101.

Charging nozzle assembly 401 includes a first nozzle assembly 40, a second nozzle assembly 60, a nozzle sleeve 6, an LED lens set 76, a lower clip 78, an upper clip 74, an LED light printed circuit board 75, a nozzle bearing ring 7, a rubber ring mount 8, a first nozzle pusher 34, a second nozzle pusher 54, a tie rod cap 32, and a tie rod cap 52, a double ball joint tie rod 50, and a double ball joint tie rod 30.

Linear sliding assembly 101 includes a linear slide drive motor 18, a linear drive nut holder 3, an axial slide housing half 11, a swivel ring half 12, a rotation adapter sleeve 14, a roller 13, and an axial slide housing half 15.

Figure 8:
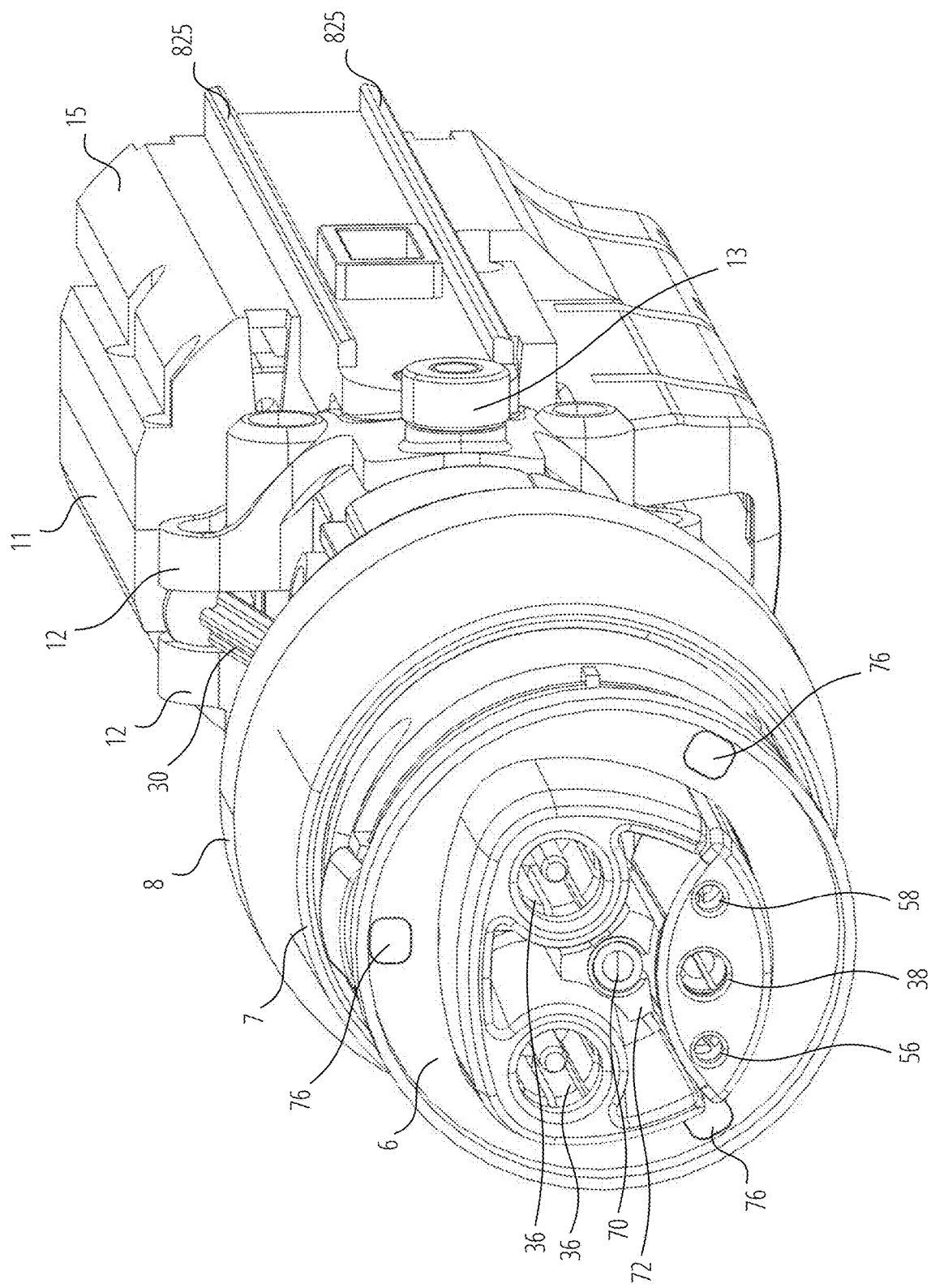
FIG. 8 is front perspective view of the mechanical assembly disposed inside the nozzle arm assembly of FIG. 5, according to an example embodiment.

FIG. 8 is front perspective view of the mechanical assembly 420 disposed inside nozzle arm assembly 201 of FIG. 5, according to an example embodiment. FIG. 8 depicts the following components: a nozzle sleeve 6, a rubber ring mount 8, an axial slide housing half 11, a swivel ring half 12, a camera holder 72, an axial slide housing half 15, a nozzle bearing ring 7, a computer vision camera 70, an LED lens set 76, a double ball joint tie rod 30, longitudinal ribs 825, a communication pin 58, a ground pin 38, a proximity pin 56, and a charging pin 36.

Figure 9:
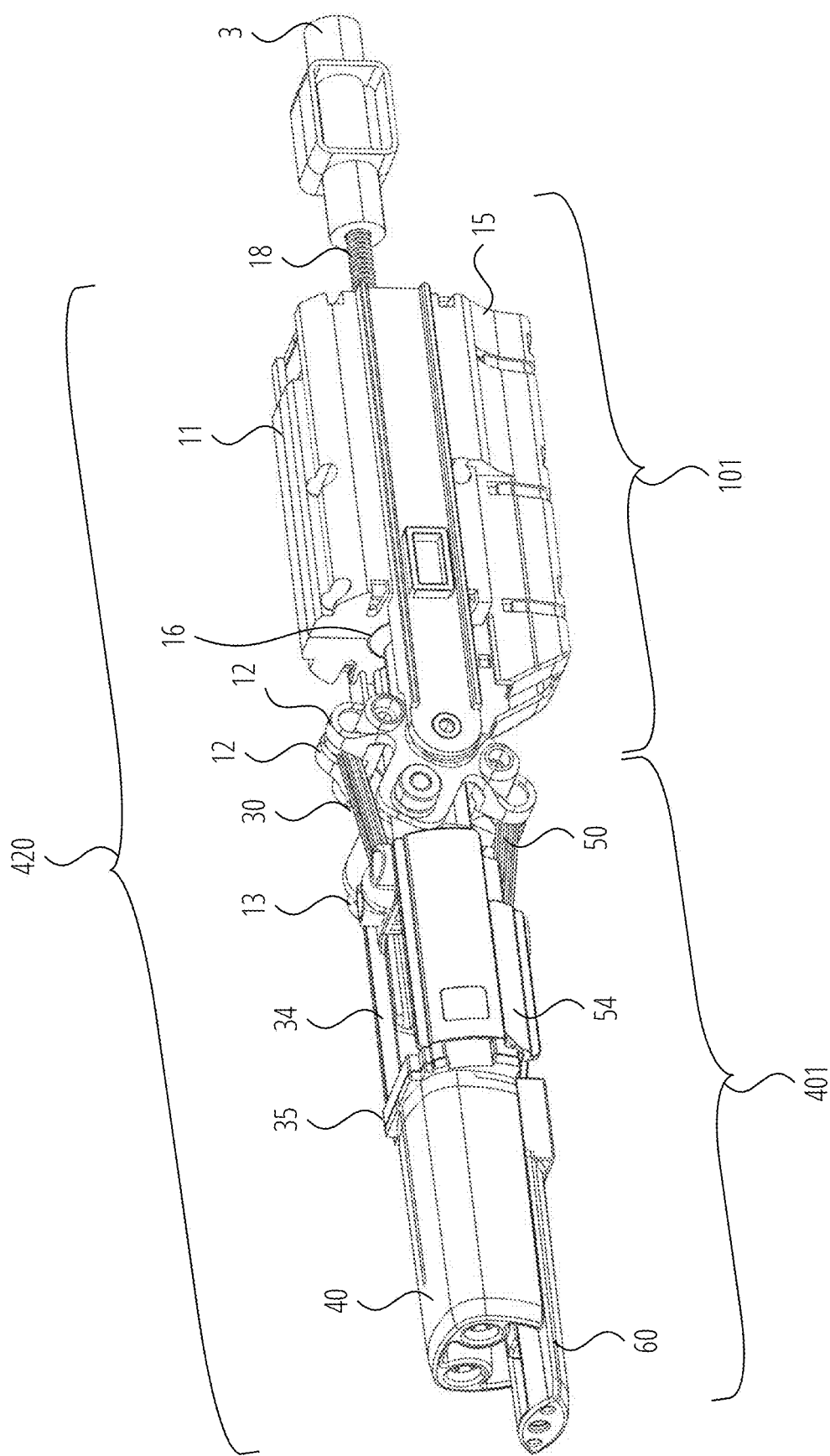
FIG. 9 is a left side perspective view of the mechanical assembly disposed inside the nozzle arm assembly of FIG. 5, according to an example embodiment.

FIG. 9 is a left side perspective view of the mechanical assembly 420 disposed inside nozzle arm assembly 201 of FIG. 5, according to an example embodiment. Mechanical assembly 420 includes a charging nozzle assembly 401 and a linear sliding assembly 101.

Charging nozzle assembly 401 includes a first nozzle assembly 40, a second nozzle assembly 60, a pin pusher 35, a first nozzle pusher 34, a second nozzle pusher 54, a roller 13, a double ball joint tie rod 30, and a double ball joint tie rod 50.

Linear sliding assembly 101 includes a rotation motor 16, a linear slide drive motor 18, a linear drive nut holder 3, an axial slide housing half 11, a swivel ring half 12, and an axial slide housing half 15.

Figure 10:
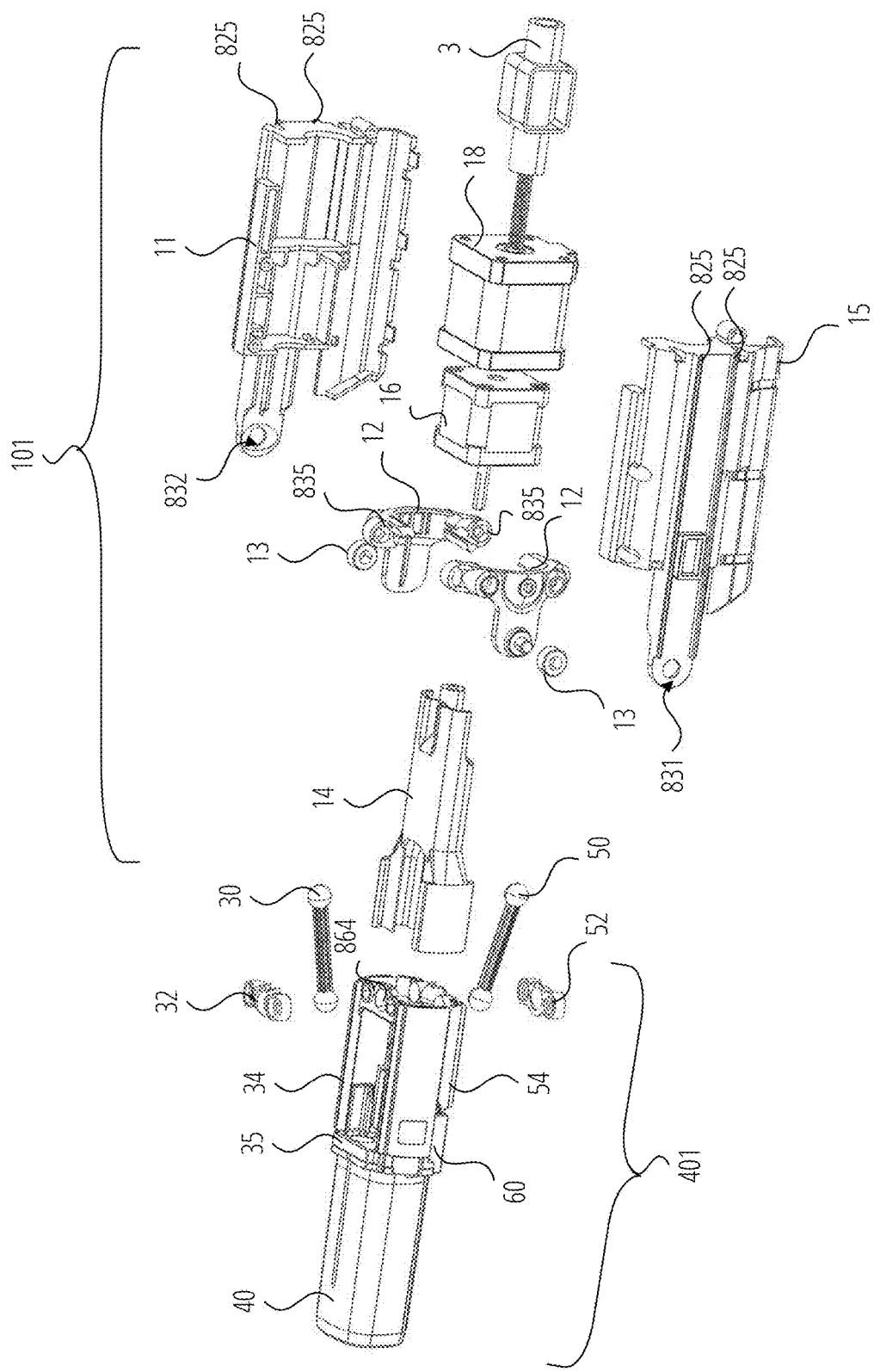
FIG. 10 is a partially exploded view of a charging nozzle assembly and a linear sliding assembly, according to an example embodiment.

FIG. 10 is a partially exploded view of a charging nozzle assembly 401 and linear sliding assembly 101, according to an example embodiment. FIG. 10 depicts the following components: a first nozzle assembly 40, a second nozzle assembly 60, a rotation motor 16, a linear slide drive motor 18, a linear drive nut holder 3, an axial slide housing half 11, a swivel ring half 12, a rotation adapter sleeve 14, a pin pusher 35, a first nozzle pusher 34, a roller 13, an axial slide housing half 15, a tie rod cap 52, a double ball joint tie rod 50, a second nozzle pusher 54, a double ball joint tie rod 30, a tie rod cap 32, a longitudinal rib 825, a linear sliding assembly 101, a spherical half surface 864, a circular surface 832, and a circular surface 831.

Figure 11:
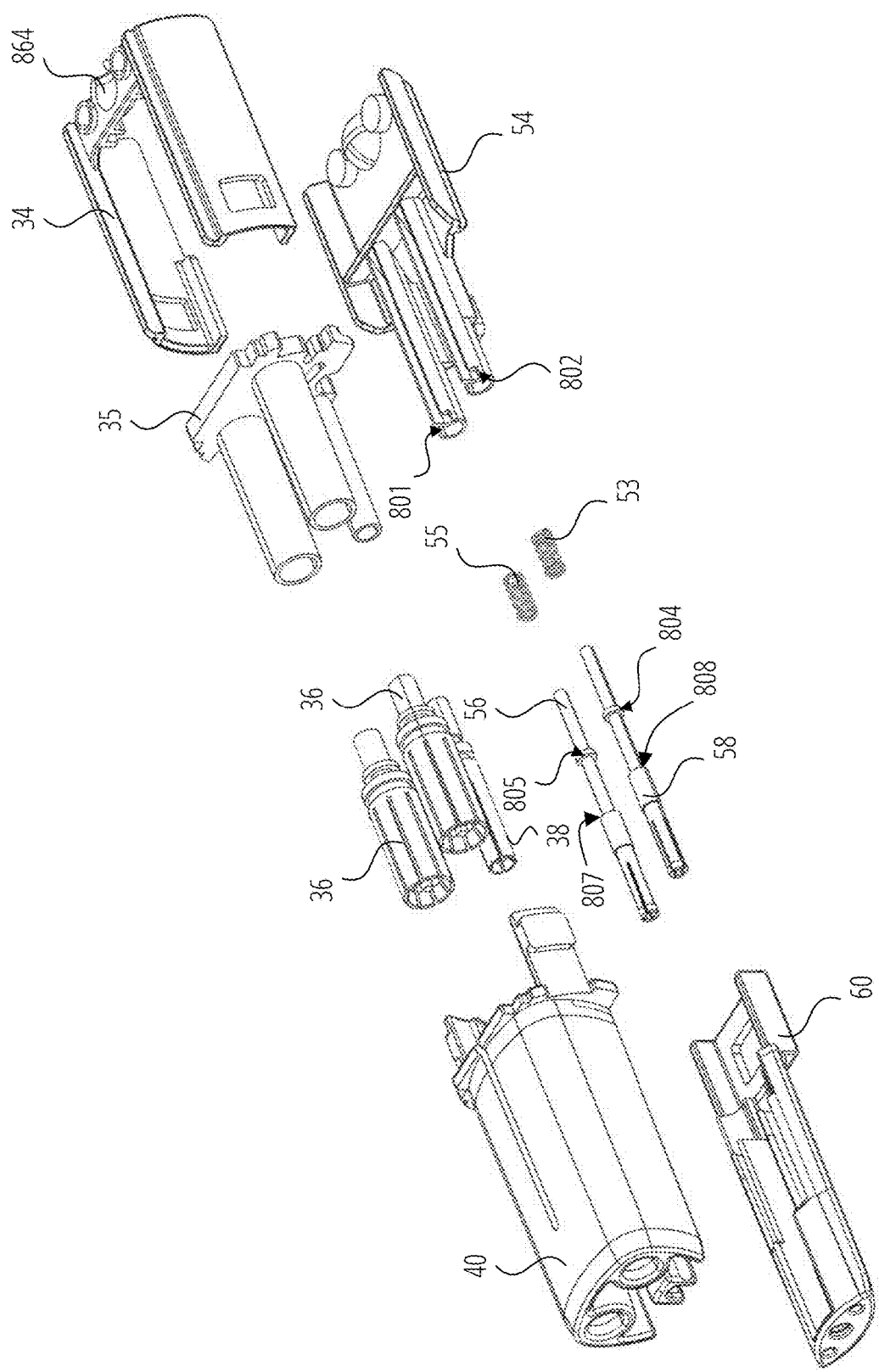
FIG. 11 is an exploded view of a second nozzle assembly and a first nozzle assembly, according to an example embodiment.

FIG. 11 is an exploded view of second nozzle assembly 60 and first nozzle assembly 40, according to an example embodiment. FIG. 11 depicts the following components: a first nozzle assembly 40, a second nozzle assembly 60, a pin pusher 35, a first nozzle pusher 34, a ground pin 38, a second nozzle pusher 54, a communication pin 58, a proximity pin 56, charging pins 36, a spherical half surface 864, a surface 802, a spring 55, a surface 804, a spring 53, a surface 805, a surface 807, a surface 808, and a surface 801.

Figure 12:
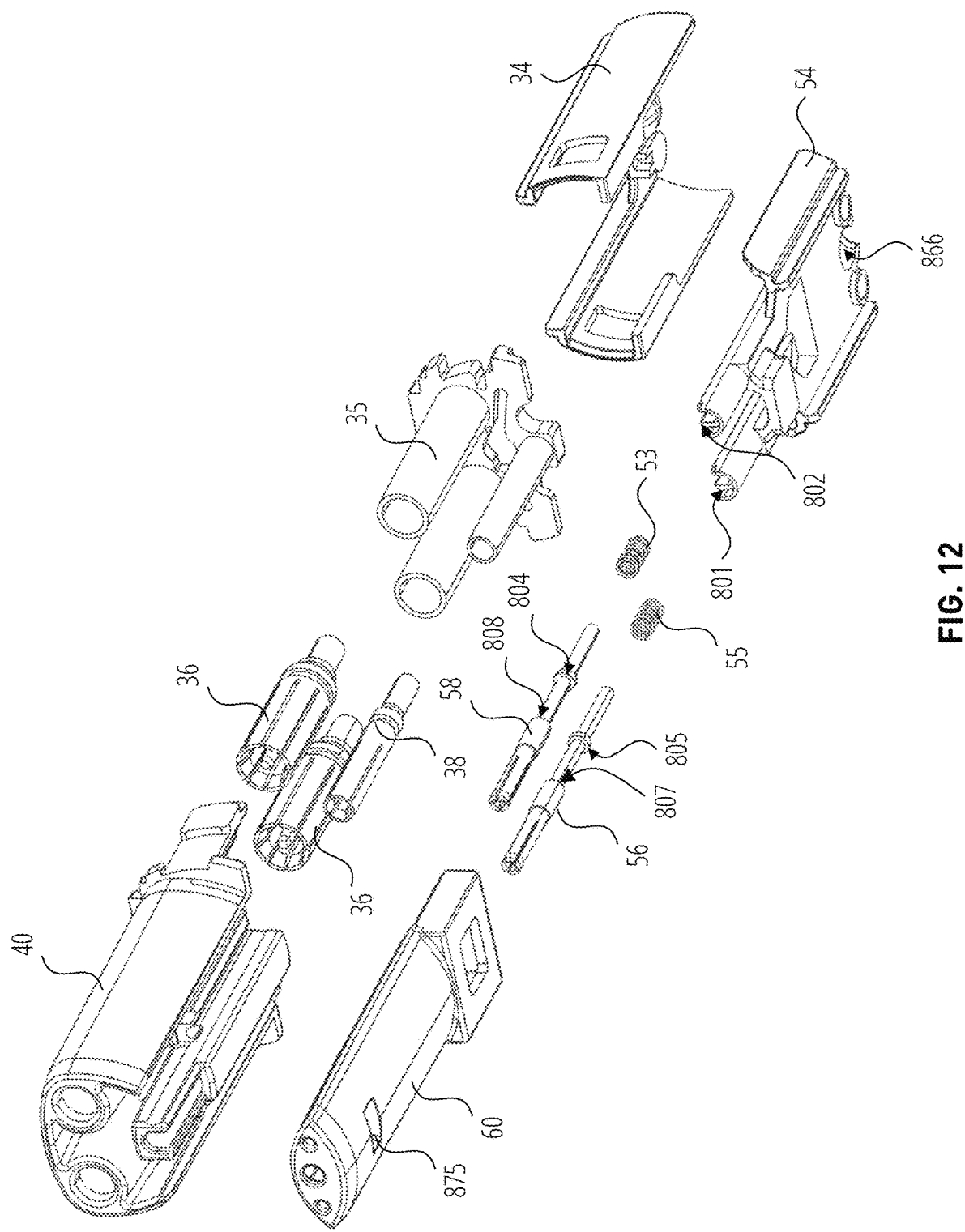
FIG. 12 is another exploded view of a second nozzle assembly and a first nozzle assembly, according to an example embodiment.

FIG. 12 is another exploded view of second nozzle assembly 60 and first nozzle assembly 40, according to an example embodiment. FIG. 12 depicts the following complements: a first nozzle assembly 40, a second nozzle assembly 60, a pin pusher 35, a first nozzle pusher 34, a second nozzle pusher 54, a communication pin 58, a ground pin 38, a proximity pin 56, charging pins 36, a surface 802, a spring 55, a surface 804, a spring 53, a surface 805, a surface 801, a surface 807, a surface 808, a locking pawl cavity 875, and a spherical half surface 866 of second nozzle pusher 54.

Figure 13:
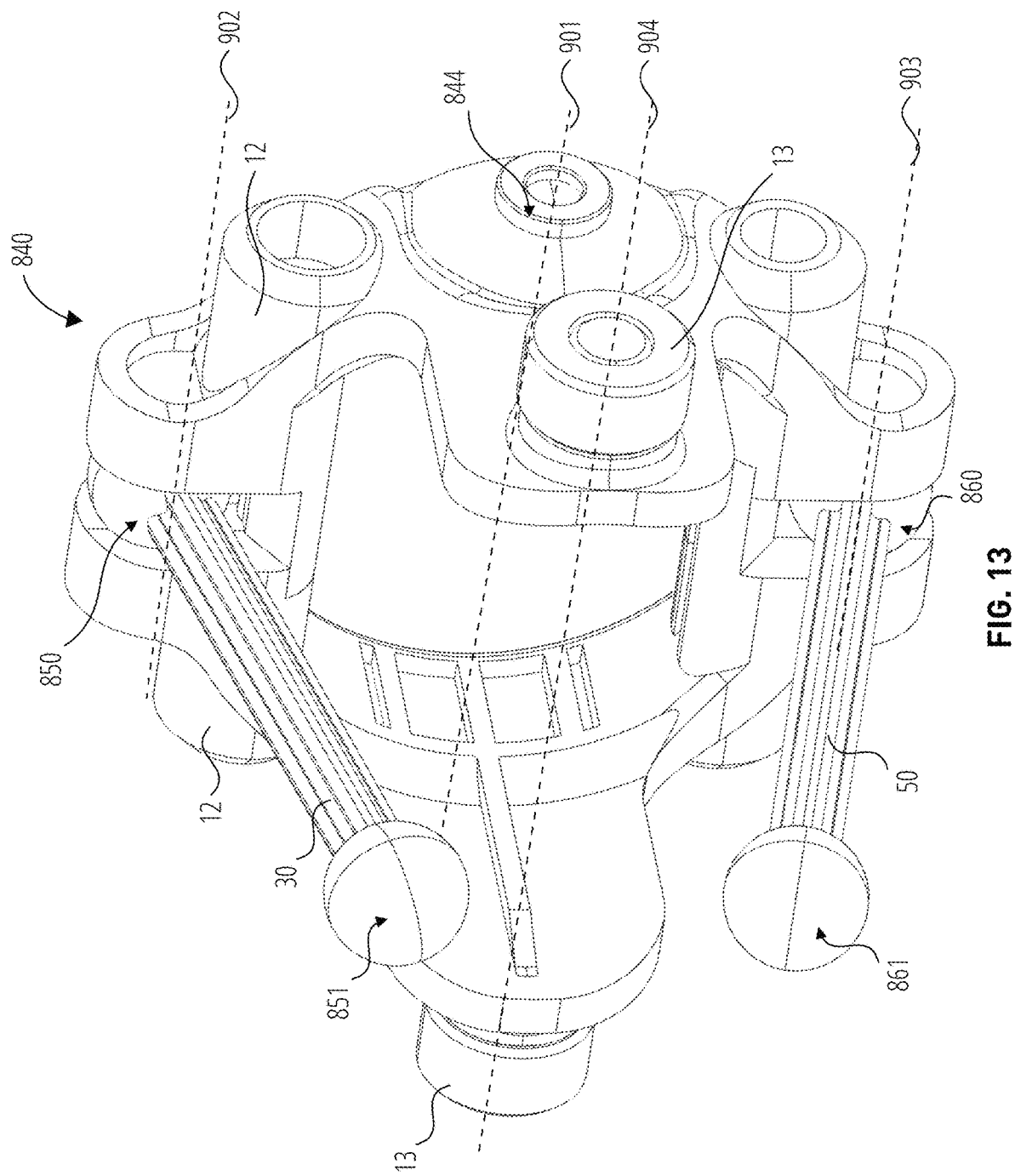
FIG. 13 is a perspective view of a combined swivel ring located inside the nozzle arm assembly of FIG. 5, according to an example embodiment.

FIG. 13 is a perspective view of a combined swivel ring 840 located inside nozzle arm assembly 201 of FIG. 5, according to an example embodiment. The combined swivel ring 840 includes swivel ring halves 12, a roller 13, a double ball joint tie rod 50, a double ball joint tie rod 30, a surface 844, a rod ball end 850, a rod ball end 851, a rod ball end 861, and a rod ball end 860. FIG. 13 also depicts an axis 902, an axis 901, an axis 904, and an axis 903.

FIG. 14 is a perspective view of a first assembly 125 disposed inside nozzle arm assembly 201 of FIG. 5, according to an example embodiment. First assembly 125 includes first nozzle assembly 40, a pin pusher 35, a first nozzle pusher 34, a double ball joint tie rod 30, a tie rod cap 32, a ground pin 38, charging pins 36, and a rod ball end 850.

Figure 15:
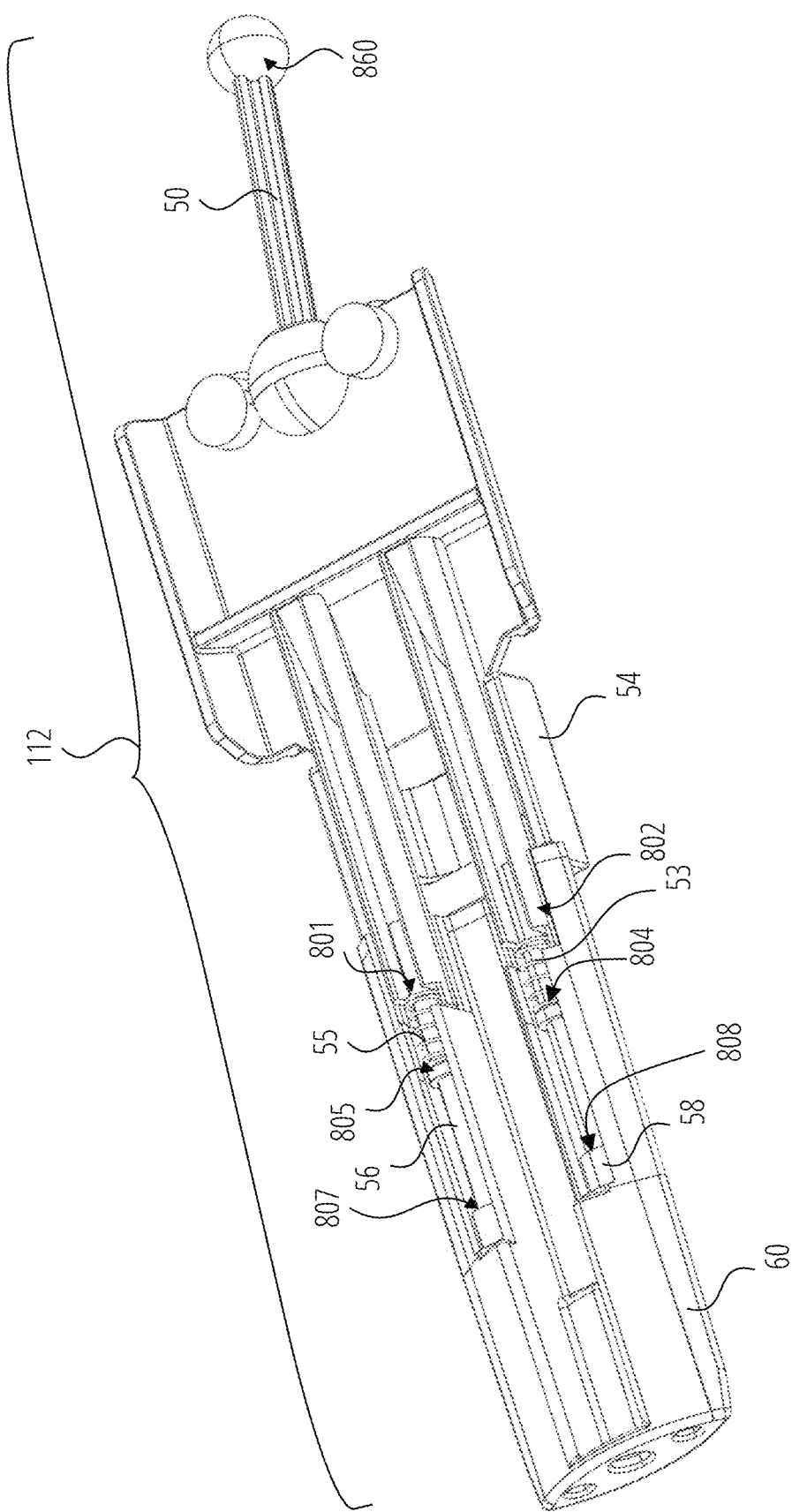
FIG. 15 is a perspective view of the second assembly disposed inside the nozzle arm assembly of FIG. 5, according to an example embodiment.

FIG. 15 is a perspective view of the second assembly 112 disposed inside nozzle arm assembly 201 of FIG. 5, according to an example embodiment. Second assembly 112 includes a second nozzle assembly 60, a double ball joint tie rod 50, a second nozzle pusher 54, a communication pin 58, a proximity pin 56, a surface 802, a spring 55, a surface 804, a spring 53, a surface 805, a surface 801, and a rod ball end 860.

Figure 16:
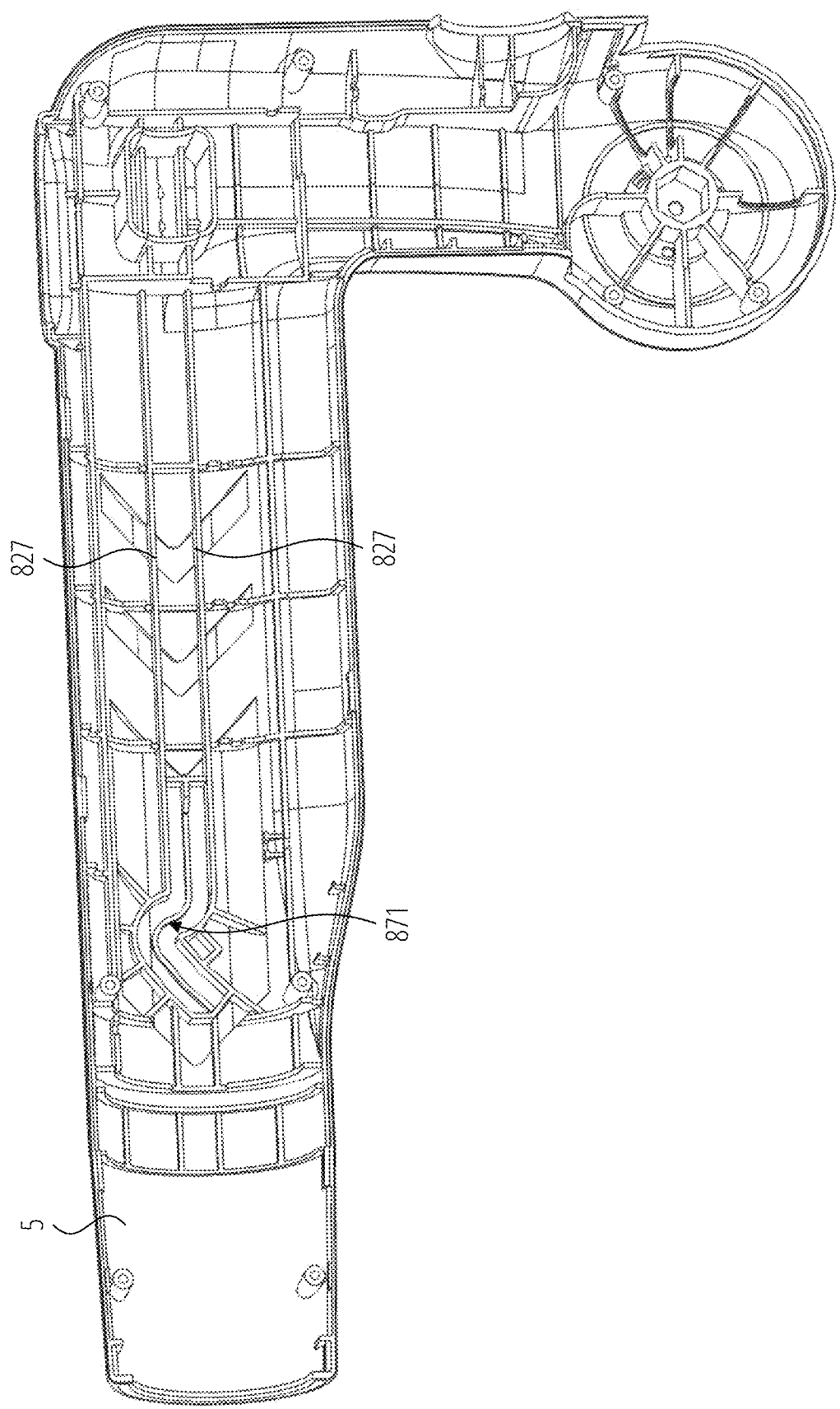
FIG. 16 is a perspective view of a housing half of the nozzle arm assembly of FIG. 5, according to an example embodiment.

FIG. 16 is a perspective view of a housing half 5 of the nozzle arm assembly 201 of FIG. 5, according to an example embodiment. Housing half 5 includes a track shape 871 and longitudinal ribs 827.

Figure 17:
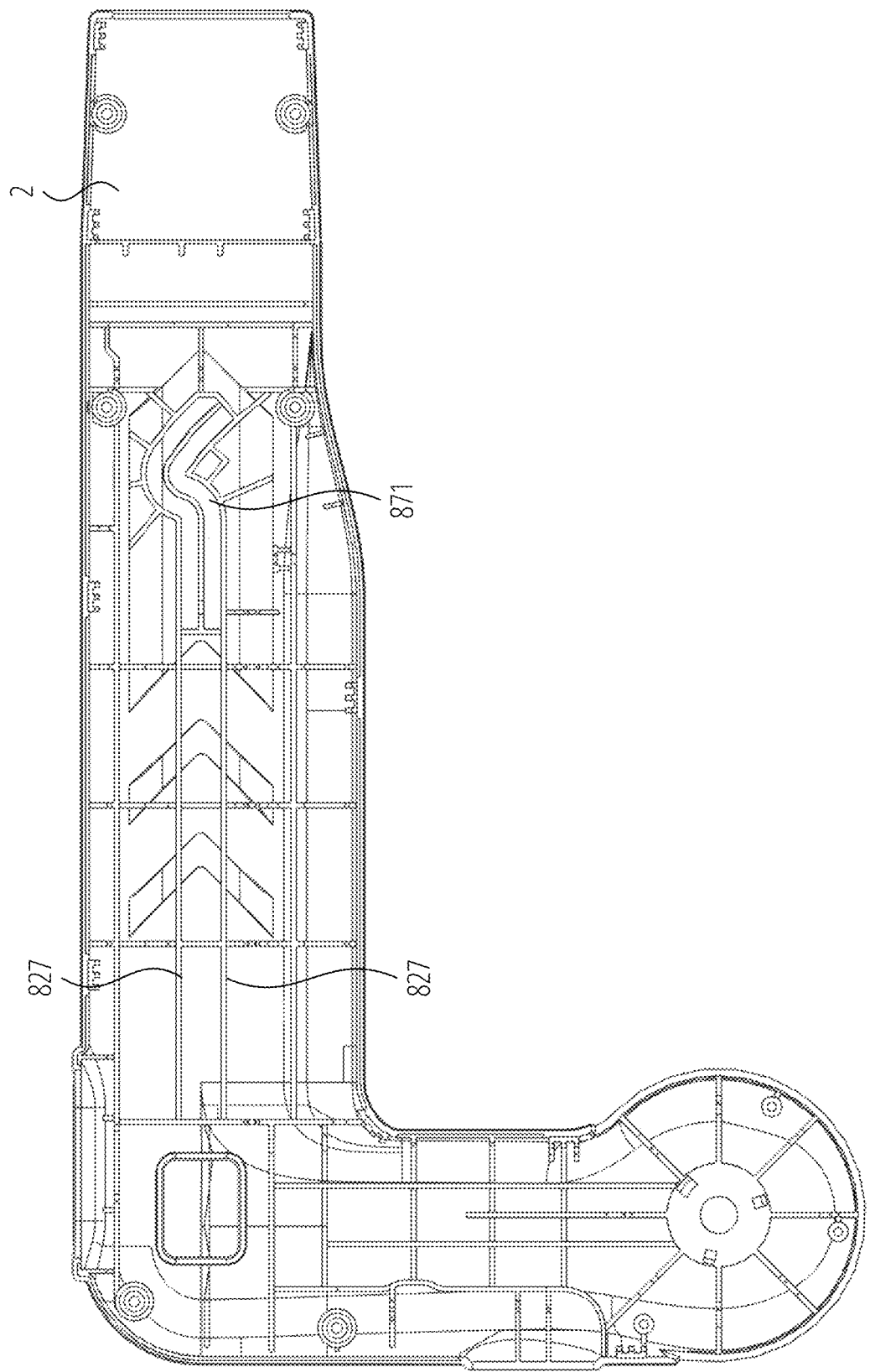
FIG. 17 is a side view of another housing half of the nozzle arm assembly of FIG. 5, according to an example embodiment.

FIG. 17 is a side view of a housing half 2 of the nozzle arm assembly 201 of FIG. 5, according to an example embodiment. Housing half 2 includes a track shape 871 and longitudinal ribs 827.

Figure 18:
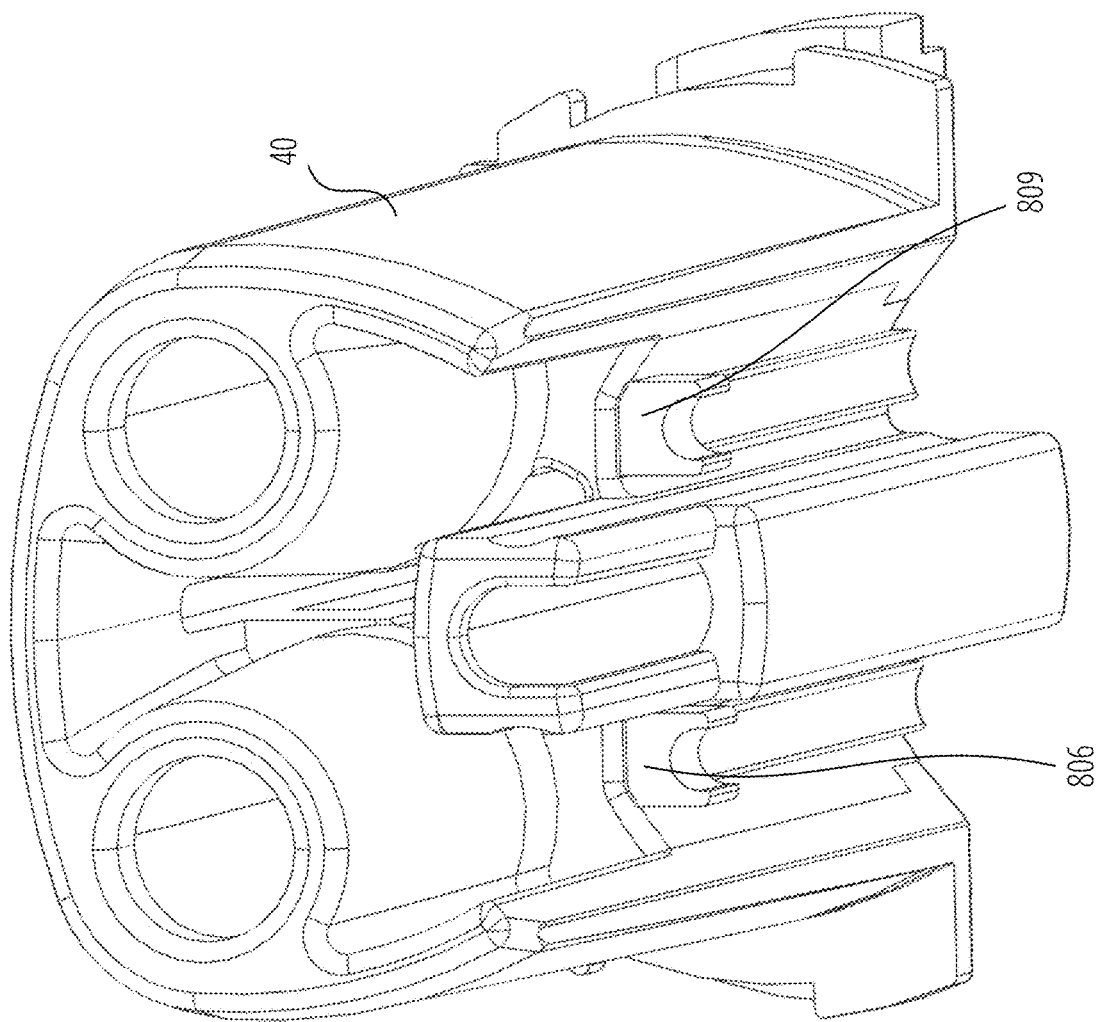
FIG. 18 is a perspective view of a first nozzle assembly of the nozzle arm assembly of FIG. 5, according to an example embodiment.

FIG. 18 is a perspective view of the first nozzle assembly 40 of the nozzle arm assembly 201 of FIG. 5, according to an example embodiment. First nozzle assembly 40 includes a protruding rib 809 and a protruding rib 806.

Figure 19:
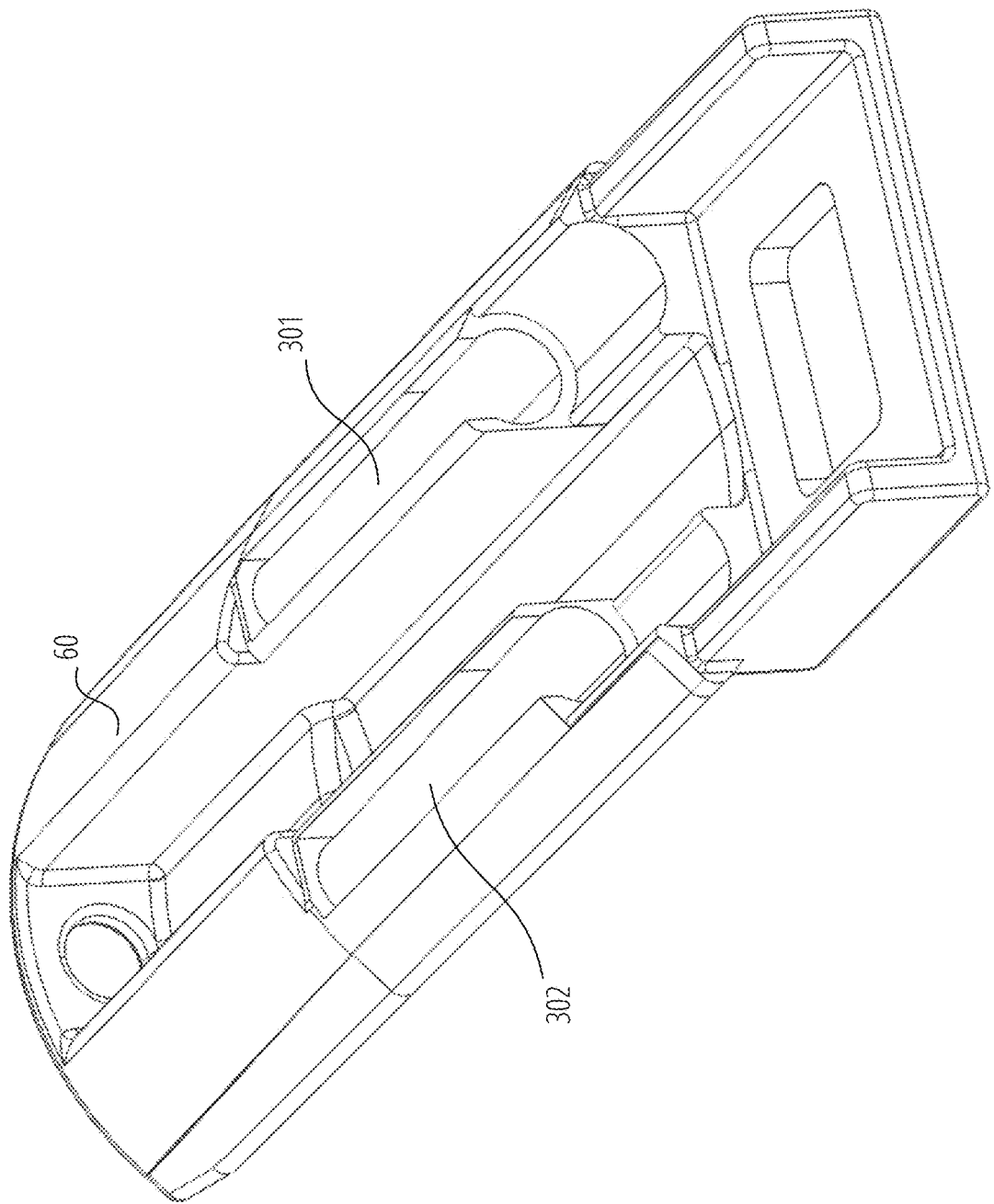
FIG. 19 is a perspective view of a second nozzle assembly of the nozzle arm assembly of FIG. 5, according to an example embodiment.

FIG. 19 is a perspective view of the second nozzle assembly 60 of the nozzle arm assembly 201 of FIG. 5, according to an example embodiment. Second nozzle assembly 60 includes a circular cavity 301 and a circular cavity 302.

Overall, as seen in FIG. 9-FIG. 15, mechanical assembly 420 includes first assembly 125 and second assembly 112 sliding with respect to each other. Mechanical assembly 420 also includes linear sliding assembly 101 including combined swivel ring 840. First nozzle assembly 40 and second nozzle assembly 60 together can move axially through nozzle sleeve 6. At the same exterior shape of first nozzle assembly 40 and second nozzle assembly 60 causes them to rotate together with nozzle sleeve 6 (shown FIG. 6-FIG. 8).

First assembly 125 includes first nozzle assembly 40, ground pin 38, two charging pins 36, pin pusher 35, and first nozzle pusher 34. Pin pusher 35 is designed to keep ground pin 38 and two charging pins 36 in their respective cavities. First nozzle assembly 40 is equipped with two latching arms that latch into dedicated pockets in first nozzle pusher 34 with pin pusher 35 contained between them and locking the terminal pins into their cavities in first nozzle assembly 40 as shown in FIG. 14.

As shown, for example, in FIG. 12, FIG. 15, and FIG. 19, second assembly 112 includes second nozzle assembly 60. Second nozzle assembly 60 has circular cavity 301 for proximity pin 56 and circular cavity 302 for communication pin 58. Proximity pin 56 and communication pin 58 may axially slide into respective cavities, approximately 12 mm, according to one example embodiment. Additionally, second assembly 112 includes second nozzle pusher 54 which interlocks with second nozzle assembly 60 so they move together along a mostly horizontal axis parallel to the centerline axis of nozzle arm assembly 201. Proximity pin 56 is spring loaded toward the bottom of circular cavity 301 by a small compression coil spring 55 which is located between surface 801 on second nozzle pusher 54 and surface 805 on proximity pin 56. Similarly, communication pin 58 is spring loaded toward the bottom of circular cavity 302 by a small compression coil spring 53 which is located between surface 802 on second nozzle pusher 54 and surface 804 on communication pin 58.

As shown, for example, in FIG. 18 and FIG. 19, first nozzle assembly 40 includes protruding rib 806 and protruding rib 809 that are designed to interact with surface 805 on proximity pin 56 and surface 804 on communication pin 58. When the forward tip of first assembly 125 and forward tip of second assembly 112 are vertically aligned, then protruding ribs 806 and 809 will force proximity pin 56 and communication pin 58 all the way forward toward the end of circular cavities 301 and 302. Alternatively, when the tip of second assembly 112 is located in front of the tip of first assembly 125, then protruding ribs 806 and 809 do not engage with pins 56 and 58, leaving only the relatively light spring load of compression coil springs 53 and 55 pushing pin 56 and pin 58 toward the bottom of circular cavities 301 and 302.

Figure 20:
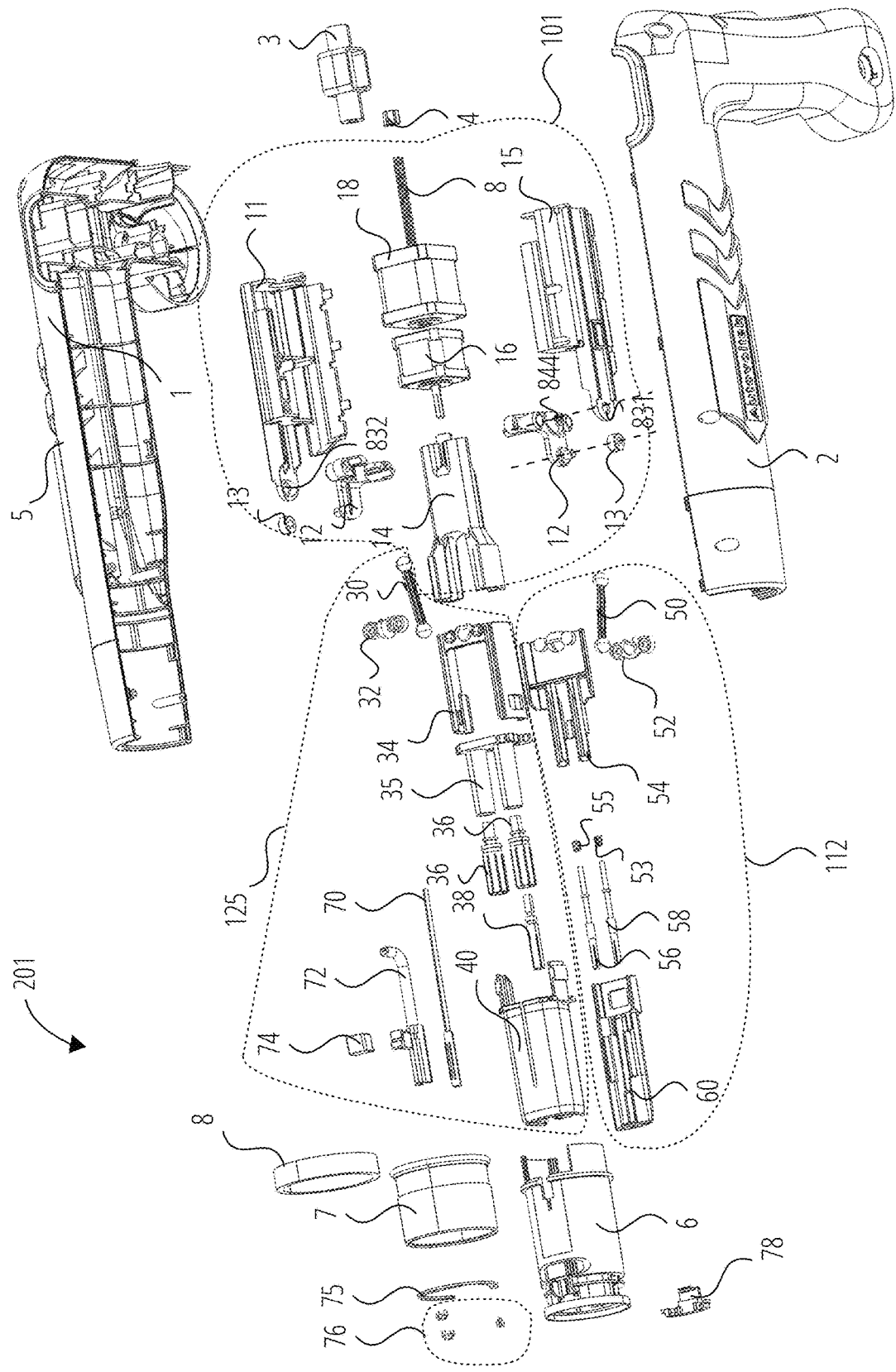
FIG. 20 is an exploded view of a nozzle arm assembly of FIG. 5, according to an example embodiment.

FIG. 20 is an exploded view of the nozzle arm assembly 201 of FIG. 5, according to an example embodiment. FIG. 20 depicts the following components: a housing half 5, a housing half 2, a nozzle sleeve 6, an LED lens set 76, an LED light printed circuit board 75, a nozzle bearing ring 7, a lower clip 78, a rubber ring mount 8, an upper clip 74, a camera holder 72, a computer vision camera 70, a first assembly 125, a second assembly 112, a linear sliding assembly 101, a linear drive nut holder 3, and a brass nut 4.

The first assembly 125 includes a first nozzle assembly 40, a ground pin 38, charging pins 36, a pin pusher 35, a first nozzle pusher 34, a tie rod cap 32, and a double ball joint tie rod 30.

The second assembly 112 includes a second nozzle assembly 60, a communication pin 58, a proximity pin 56, a spring 55, a spring 53, a second nozzle pusher 54, a tie rod cap 52, and a double ball joint tie rod 50.

The linear sliding assembly 101 includes a rotation motor 16, a linear slide drive motor 18, an axial slide housing half 11, a swivel ring half 12, a rotation adapter sleeve 14, a roller 13, an axial slide housing half 15. Swivel ring half 12 has a surface 844. Axial slide housing half 11 has a circular surface 832. Axial slide housing half 15 has a circular surface 831.

Figure 21:
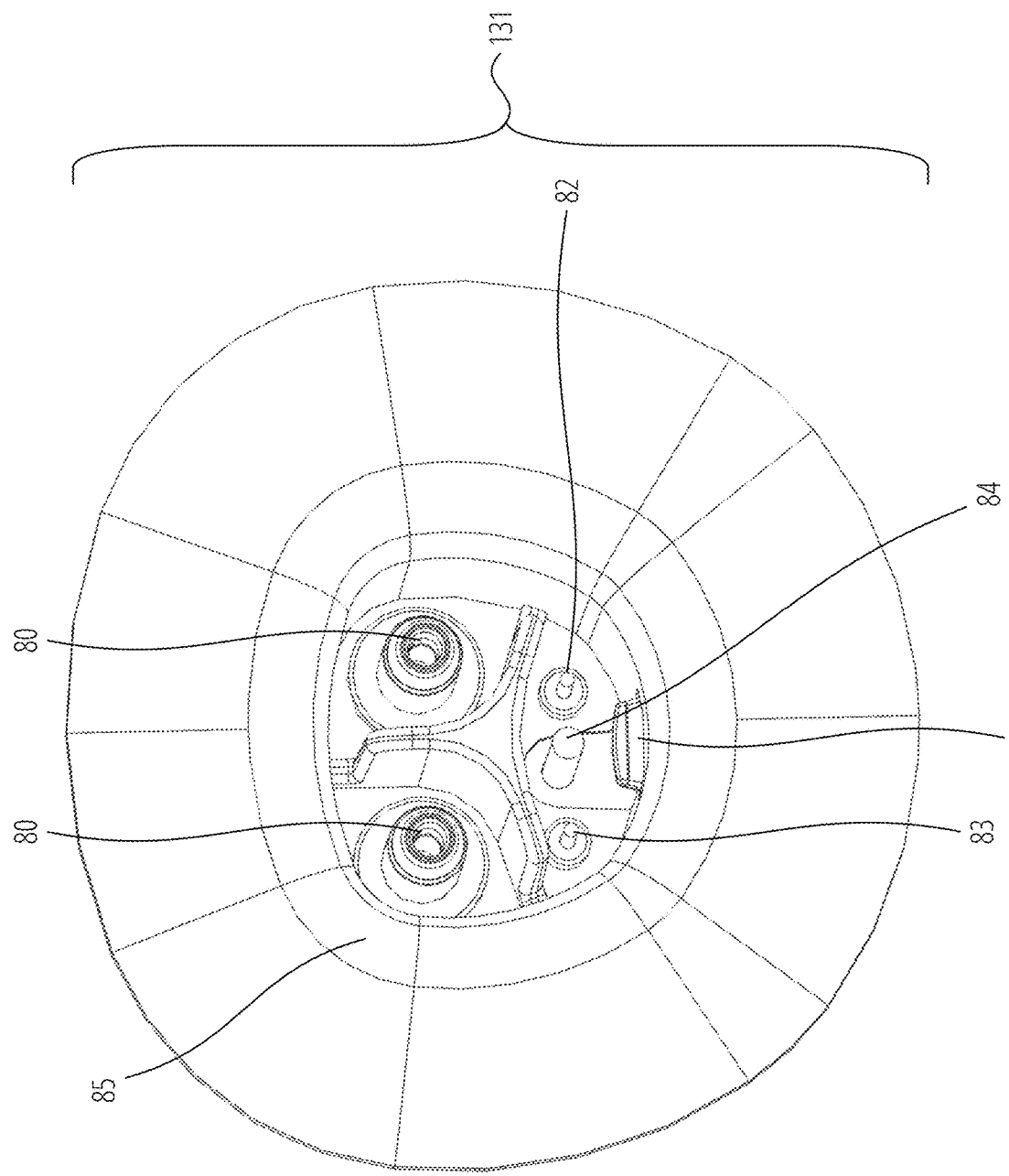
FIG. 21 is a front view of a charging port of an electric vehicle, according to an example embodiment.

FIG. 21 is a front view of a charging port 131 of an electric vehicle, according to an example embodiment. Charging port 131 is suitable for interacting with nozzle arm assembly 201 of charging robot 501. Charging port 131 includes an inlet communication pin 83, a locking pawl 81, an inlet ground pin 84, an inlet socket housing 85, an inlet charging female pin 80, and an inlet proximity pin 82.

Figure 22:
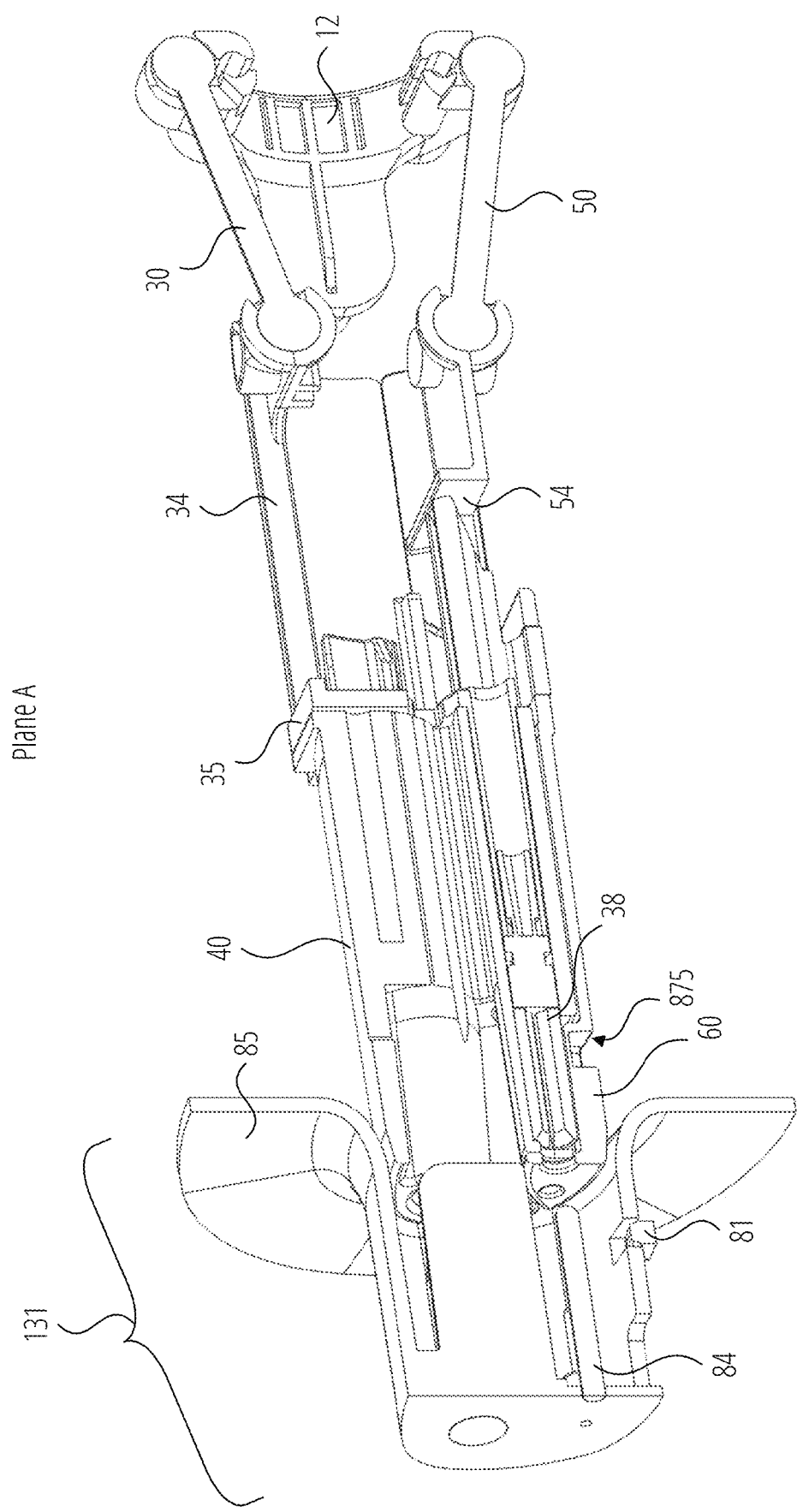
FIG. 22 is a perspective sectional view of a nozzle arm assembly and a charging port along a first plane at a first engagement position, according to an example embodiment.

FIG. 22 is a perspective sectional view of nozzle arm assembly 201 and charging port 131 along a first plane A at a first engagement position, according to an example embodiment. FIG. 22 depicts the following components: a first nozzle assembly 40, a second nozzle assembly 60, a swivel ring half 12, a pin pusher 35, a first nozzle pusher 34, a double ball joint tie rod 50, a second nozzle pusher 54, a double ball joint tie rod 30, a ground pin 38, a locking pawl cavity 875, a locking pawl 81, an inlet ground pin 84, an inlet socket housing 85.

In the first engagement position the edge of second nozzle assembly 60 is aligned with the edge of first nozzle assembly 40. Both the second nozzle assembly 60 and first nozzle assembly 40 are lining up with charging port 131. Inlet ground pin 84 of charging port 131 is not engaged with ground pin 38 of second nozzle assembly 60. Double ball joint tie rod 50 and double ball joint tie rod 30 are symmetrical with a longitudinal axis of nozzle arm assembly 201. Swivel ring half 12 is orthogonal to with respect to a longitudinal axis of nozzle arm assembly 201.

Figure 23:
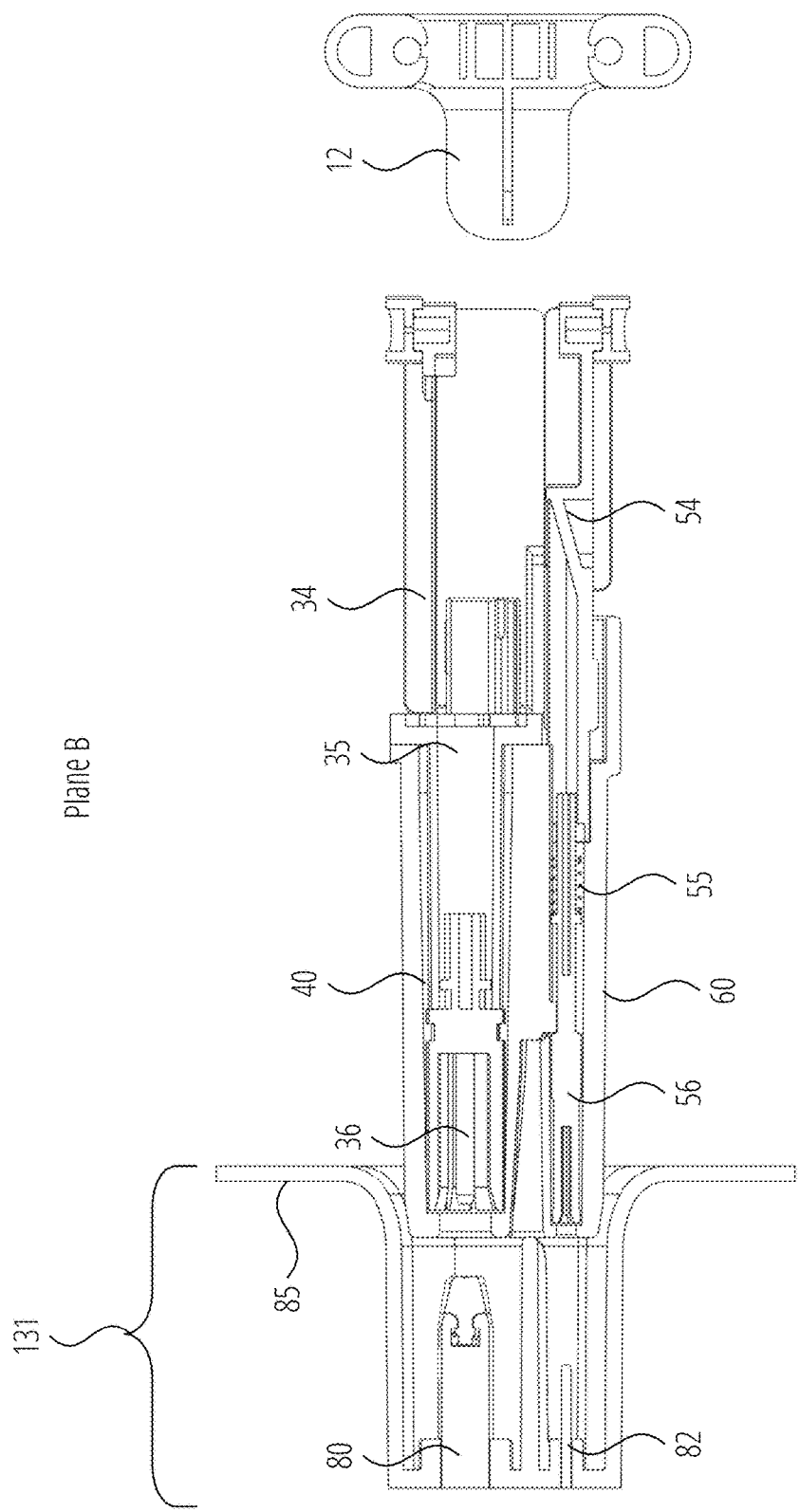
FIG. 23 is a side sectional view of a nozzle arm assembly and a charging port along a second plane at the first engagement position, according to an example embodiment.

FIG. 23 is a side sectional view of nozzle arm assembly 201 and charging port 131 along a second plane B at the first engagement position, according to an example embodiment. FIG. 23 depicts the following components: a first nozzle assembly 40, a second nozzle assembly 60, a swivel ring half 12, a pin pusher 35, a first nozzle pusher 34, a second nozzle pusher 54, a proximity pin 56, a charging pin 36, a spring 55, an inlet socket housing 85, an inlet charging female pin 80, and an inlet proximity pin 82.

As described above in connection with FIG. 22, in the first engagement position, the edge of second nozzle assembly 60 is aligned with the edge of first nozzle assembly 40. Both the second nozzle assembly 60 and first nozzle assembly 40 are lining up with charging port 131. Inlet ground pin 84 of charging port 131 is not engaged with ground pin 38 of second nozzle assembly 60. Swivel ring half 12 is orthogonal to with respect to a longitudinal axis of nozzle arm assembly 201.

Figure 24:
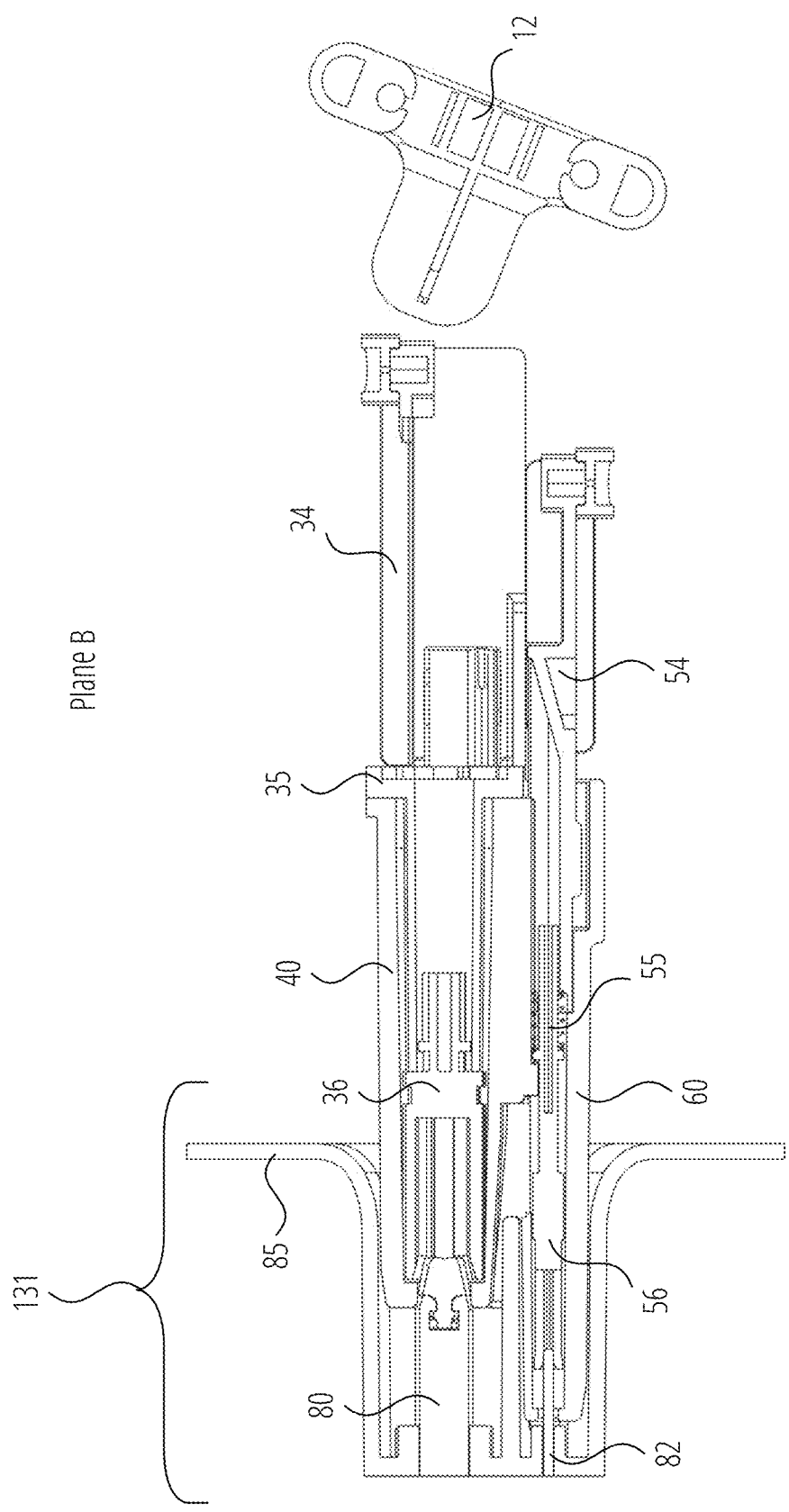
FIG. 24 is a side sectional view of a nozzle arm assembly and a charging port along the second plane at the second engagement position, according to an example embodiment.

FIG. 24 is a side sectional view of nozzle arm assembly 201 and charging port 131 along a second plane B at the second engagement position, according to an example embodiment. FIG. 24 depicts the following components: a first nozzle assembly 40, a second nozzle assembly 60, a swivel ring half 12, a pin pusher 35, a first nozzle pusher 34, a second nozzle pusher 54, a proximity pin 56, a charging pin 36, a spring 55, an inlet socket housing 85, an inlet charging female pin 80, and an inlet proximity pin 82.

In the second engagement position, the second nozzle assembly 60 is fully inserted into inlet socket housing 85, while first nozzle assembly 40 is not. Correspondently the edge of second nozzle assembly 60 is not aligned with the edge of first nozzle assembly 40. Proximity pin 56 of second nozzle assembly 60 is engaged with inlet proximity pin 82. Communication pin 58 (obscured in FIG. 24) is making electrical contact with inlet communication pin 83 (obscured in FIG. 24) of charging port 131. Ground pin 38 and charging pins 36 disposed in first nozzle assembly 40 do not engage with corresponding inlet ground pin 84 and inlet charging female pins 80. Swivel ring half 12 is inclined with respect to a longitudinal axis of nozzle arm assembly 201.

Figure 25:
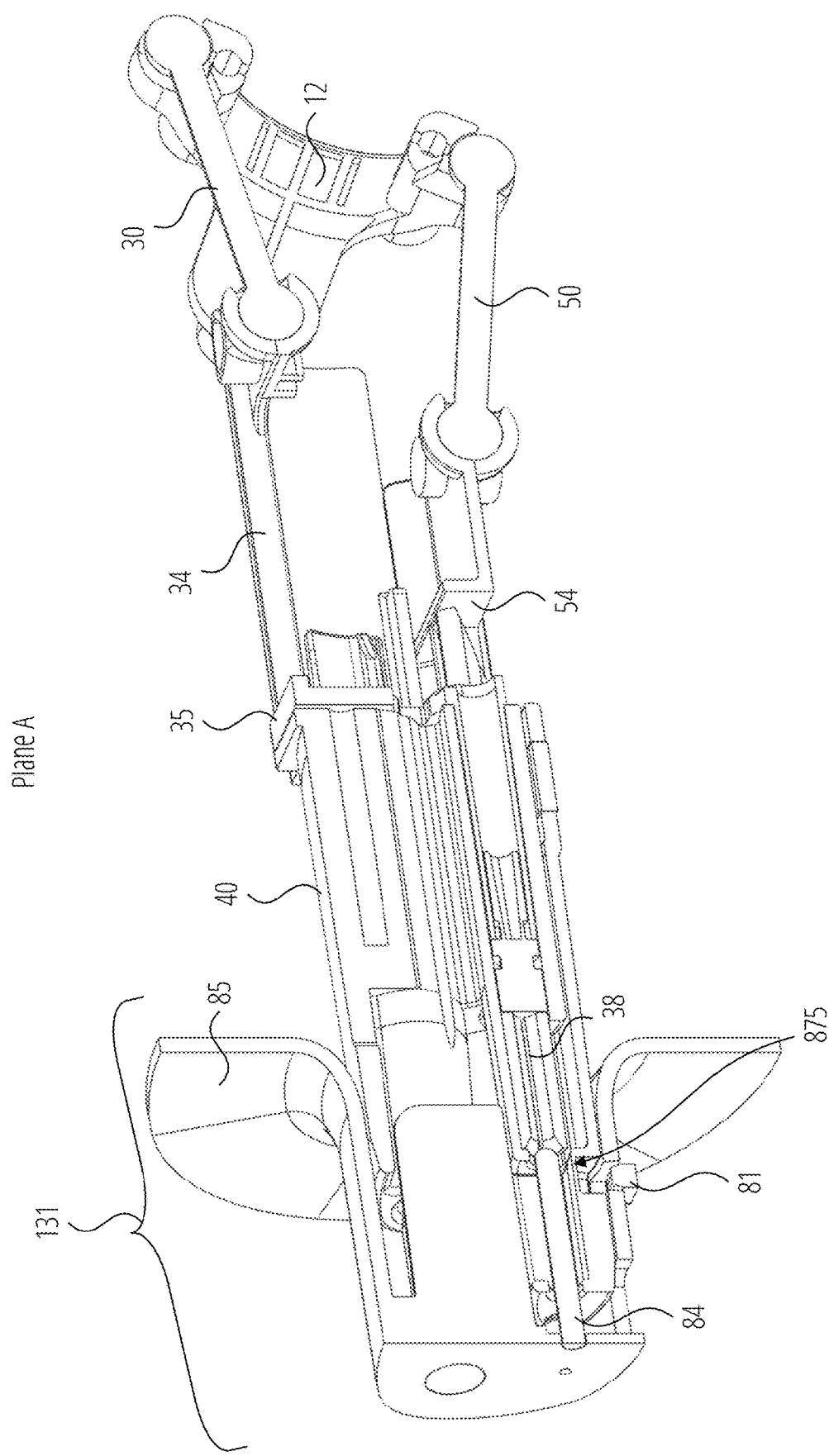
FIG. 25 is a perspective sectional view of a nozzle arm assembly and a charging port along the first plane at the second engagement position.

FIG. 25 is a perspective sectional view of nozzle arm assembly 201 and charging port 131 along a first plane A at the second engagement position. FIG. 25 depicts the following components: a first nozzle assembly 40, a swivel ring half 12, a pin pusher 35, a first nozzle pusher 34, a double ball joint tie rod 50, a second nozzle pusher 54, a double ball joint tie rod 30, a ground pin 38, a locking pawl cavity 875, a locking pawl 81, an inlet ground pin 84, an inlet socket housing 85.

As described above in connection with FIG. 24, in the second engagement position, the second nozzle assembly 60 is fully inserted into inlet socket housing 85, while first nozzle assembly 40 is not. Correspondently the edge of second nozzle assembly 60 is not aligned with the edge of first nozzle assembly 40. Proximity pin 56 of second nozzle assembly 60 is engaged with inlet proximity pin 82. Communication pin 58 (not shown in FIG. 25) is making electrical contact with inlet communication pin 83 (not shown in FIG. 25) of charging port 131. Locking pawl 81 is aligned but not engaged with locking pawl cavity 875 of second nozzle assembly 60.

Ground pin 38 and charging pins 36 disposed in first nozzle assembly 40 are not yet making electrical contact with corresponding inlet ground pin 84 and inlet charging female pins 80. Swivel ring half 12 is inclined with respect to a longitudinal axis of nozzle arm assembly 201. Double ball joint tie rod 50 is further pushed towards inlet socket housing 85 than double ball joint tie rod 30.

Figure 26:
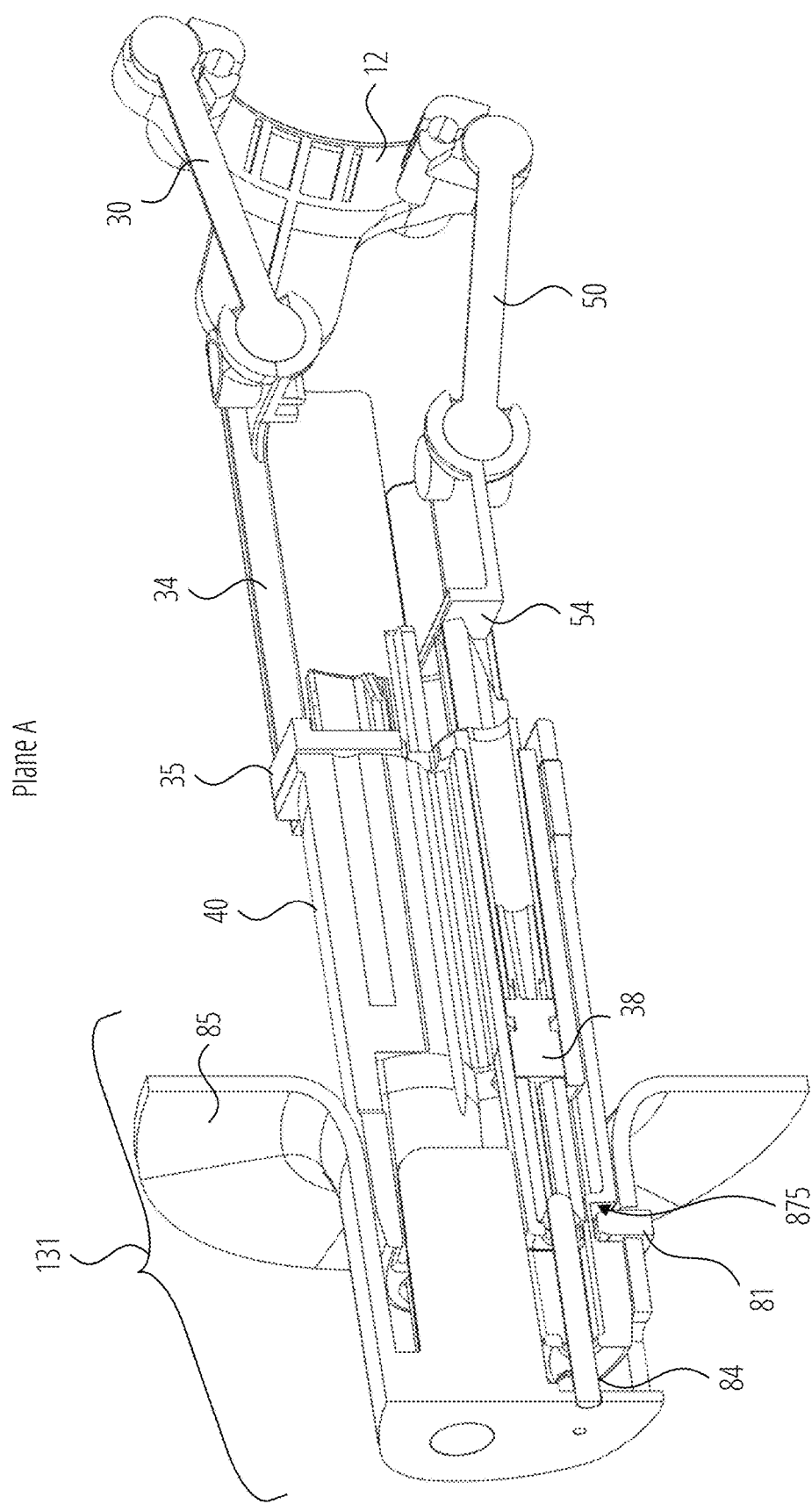
FIG. 26 is a perspective sectional view of a nozzle arm assembly and a charging port along the first plane at a third engagement position, according to an example embodiment.

FIG. 26 is a perspective sectional view of nozzle arm assembly 201 and charging port 131 along a first plane A at a third engagement position, according to an example embodiment. FIG. 26 depicts the following components: a first nozzle assembly 40, a swivel ring half 12, a pin pusher 35, a first nozzle pusher 34, a double ball joint tie rod 50, a second nozzle pusher 54, a double ball joint tie rod 30, a ground pin 38, a locking pawl cavity 875, a locking pawl 81, an inlet ground pin 84, and an inlet socket housing 85.

In the third engagement position, second nozzle assembly 60 is fully inserted into inlet socket housing 85. First nozzle assembly 40 is not yet fully inserted into inlet socket housing 85. However, ground pin 38 of the first nozzle assembly 40 is making electrical contact with inlet ground pin 84 of charging port 131, which in turn causes locking pawl 81 to engage with locking pawl cavity 875 of second nozzle assembly 60, thereby securing second nozzle pusher 54 inside inlet socket housing 85.

Figure 27:
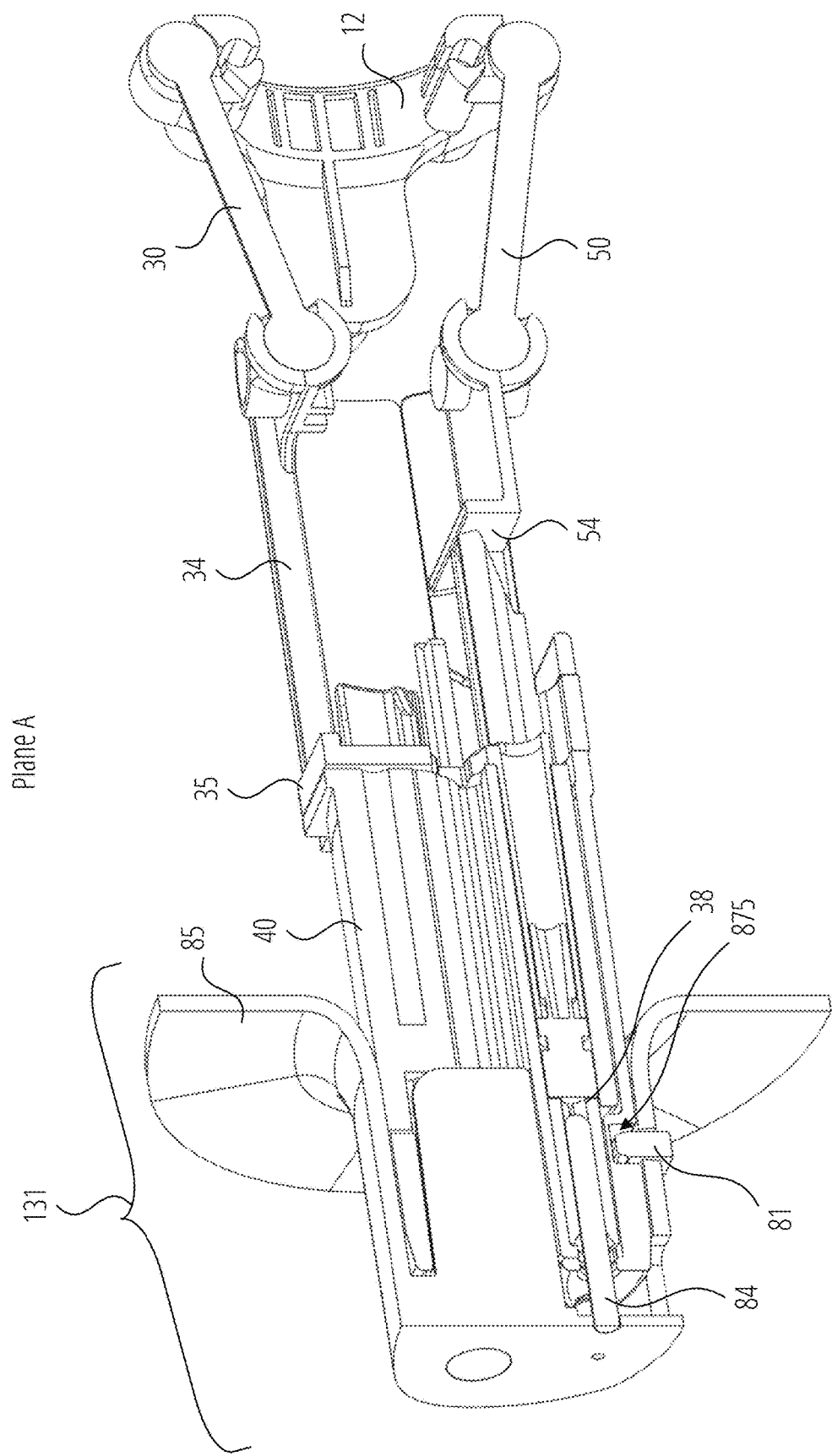
FIG. 27 is a perspective sectional view of a nozzle arm assembly and a charging port along the first plane at a fourth engagement position, according to an example embodiment.

FIG. 27 is a perspective sectional view of nozzle arm assembly 201 and charging port 131 along a first plane A at a fourth engagement position, according to an example embodiment. FIG. 27 depicts the following components: a first nozzle assembly 40, a swivel ring half 12, a pin pusher 35, a first nozzle pusher 34, a double ball joint tie rod 50, a second nozzle pusher 54, a double ball joint tie rod 30, a ground pin 38, a locking pawl cavity 875, a locking pawl 81, an inlet ground pin 84, and an inlet socket housing 85.

In the fourth engagement position, both second nozzle assembly 60 and first nozzle assembly 40 are fully inserted in charging port 131. Locking pawl 81 is engaged with locking pawl cavity 875 of second nozzle assembly 60 to lock second nozzle pusher 54 inside inlet socket housing 85. Ground pin 38 is engaged with inlet ground pin 84. Charging pins 36 (shown, for example, in FIG. 20 and FIG. 28) of first nozzle assembly 40 are engaged with corresponding inlet charging female pins 80 (shown, for example, in FIG. 21 and FIG. 28), thereby making it possible to charge the electric vehicle.

Figure 28:
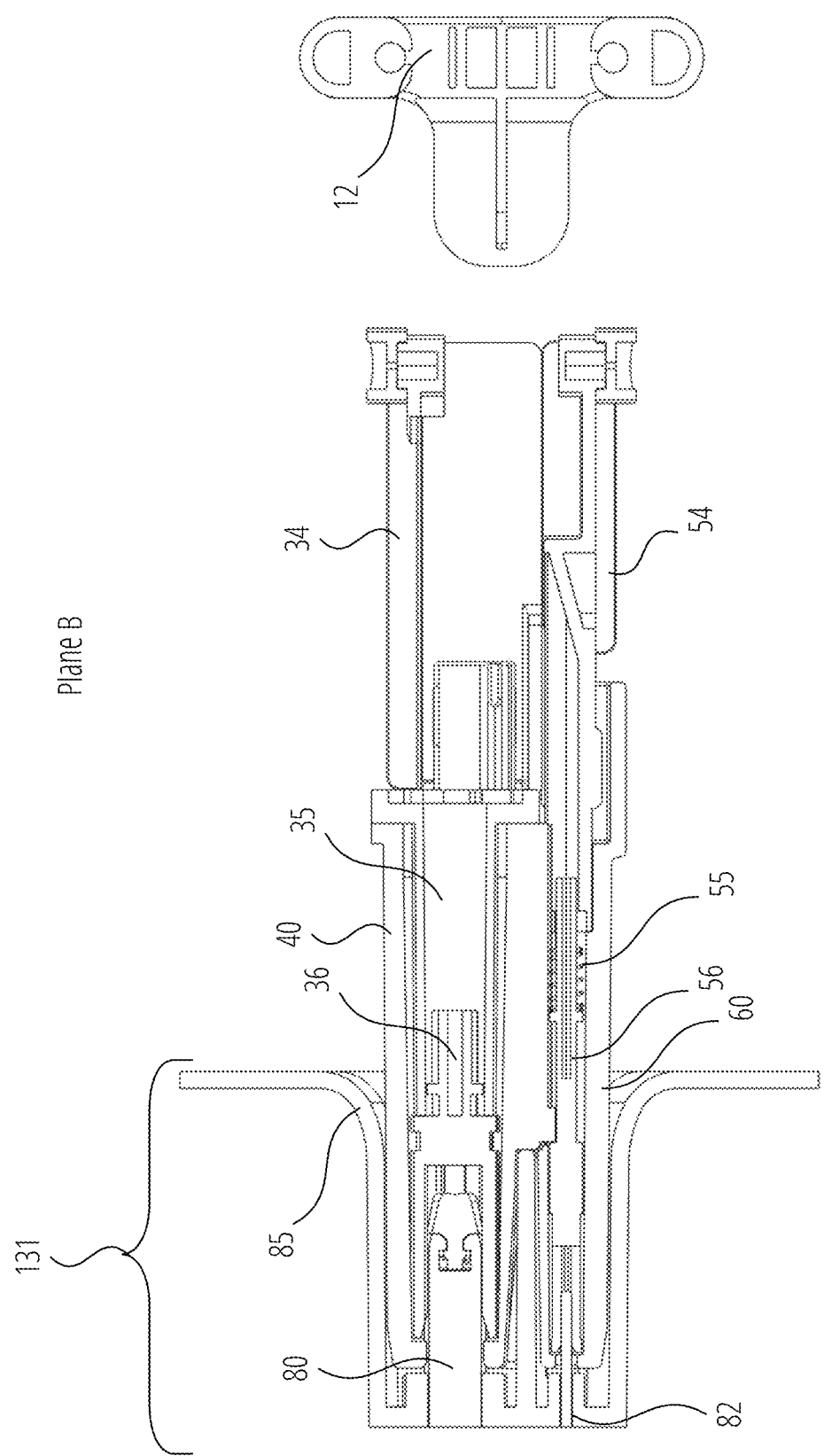
FIG. 28 is a side sectional view of a nozzle arm assembly and a charging port along the second plane at the fourth engagement position, according to an example embodiment.

FIG. 28 is a side sectional view of nozzle arm assembly 201 and charging port 131 along a second plane B at the fourth engagement position, according to an example embodiment. FIG. 28 depicts the following components: a first nozzle assembly 40, a second nozzle assembly 60, a swivel ring half 12, a pin pusher 35, a first nozzle pusher 34, a second nozzle pusher 54, a proximity pin 56, a charging pin 36, a spring 55, an inlet socket housing 85, an inlet charging female pin 80, and an inlet proximity pin 82.

As described above in FIG. 27, in the fourth engagement position, first nozzle assembly 40 and second nozzle assembly 60 are fully inserted in inlet socket housing 85 of charging port 131. Proximity pin 56 is engaged with inlet proximity pin 82. Charging pin 36 of first nozzle assembly 40 is engaged with corresponding inlet charging female pin 80, thereby making it possible to charge the electric vehicle.

Referring back to FIG. 7, FIG. 10, and FIG. 20, the output shaft of rotation motor 16 is fixed connected to rotation adapter sleeve 14 which slides into the geometry created by first nozzle pusher 34 and second nozzle pusher such that it has sliding freedom. When rotation motor 16 is actuated, rotation adapter sleeve 14 will push both first nozzle pusher 34 and second nozzle pusher 54. Movement of first nozzle pusher and second nozzle pusher 54 causes propulsion of all components in first assembly 125 and second assembly 112, as well as nozzle sleeve 6 and computer vision camera 70, camera holder 72, LED light printed circuit board 75, related LED lens set 76, and fitting hardware complements, thereby aligning first nozzle assembly 40 and second nozzle assembly 60 with vehicle charging port 131.

As shown in FIG. 10, linear slide drive motor 18 and rotation motor 16 are located inside linear sliding assembly 101 including axial slide housing half 11 and axial slide housing half 15. Each of axial slide housing half 11 and axial slide housing half 15 are equipped with longitudinal ribs 825 on the exterior that engage with longitudinal ribs 827 inside outer arm housing half 5 (shown in FIG. 16) and outer arm housing half 2 (shown in FIG. 17) and thus enable axial movement along a longitudinal axis though the nozzle arm assembly 201. Linear slide drive motor 18 is equipped with a threaded shaft 8 with a length equivalent to the total travel required for linear sliding assembly 101 and this threaded shaft 8 engages with a brass nut 4 located in linear drive nut holder 3 that is fixed mounted into dedicated recesses formed on the inside surfaces of outer arm housing half 5 and outer arm housing half 2.

As shown in FIG. 10 and FIG. 13, two identical swivel ring halves 12 together form a combined swivel ring 840 with extended arms and pins around which two rollers 13 will rotate. Surface 844 engages with circular surface 831 in axial slide housing half 15 and circular surface 832 in axial slide housing half 11. This means that as the linear sliding assembly 101 moves linearly it will also force combined swivel ring 840 to move with it, but combined swivel ring 840 can rotate around axis 901 through surfaces 844 concentric to circular surface 831 and circular surface 832.

As shown in FIG. 10 and FIG. 13, swivel ring halves 12 each are equipped with two spherical surfaces 835 that engage with the ball ends of double ball joint tie rod 30 and double ball joint tie rods 50 such that when two swivel ring halves 12 are clamped together using suitable screws they contain rod ball ends 850 and 860 while allowing rotation in the ball joint. Tie rod ball end 851 engages with spherical half surface 864 in first nozzle pusher 34 and tie rod cap 32, which has a spherical half surface placed over rod ball end 851, and is bolted to first nozzle pusher 34 using suitable screws closing the ball joint but allowing some freedom of rotation. Additionally, rod ball end 861 engages with a spherical half surface 866 in second nozzle pusher 54 and a tie rod cap 52 having a spherical surface placed over rod ball end 861. Tie rod cap 52 is bolted to second nozzle pusher 54 using suitable screws to lock the rod ball end 861 but allowing some freedom of rotation. The centerline distance between axis 901 and axis 902 and between axis 901 and axis 903 is identical.

Still referring to FIG. 10 and FIG. 13, two rollers 13 engage in suitable fixed track shapes 871 formed on the inside surfaces of housing half 5 and housing half 2 (shown in FIG. 16 and FIG. 17). The track shape 871 determines the rotation angle of combined swivel ring 840 for each linear position of the linear sliding assembly 101 along its travel, and thus determines the relationship between the movements of first assembly 125 and second assembly 112 at any point along the linear travel. It should be noted that the distance between axis 901 and axis 902 (FIG. 13) is identical to the distance between axis 901 and axis 904 which runs through the centerline of rollers 13.

The geometry of track shape 871 is designed such that, while linear slide drive motor 18 drives the charging nozzle assembly 401 toward the charging port 131, track shape 871 guides the roller 13 to rotate combined swivel ring 840. The rotation of combined swivel ring 840 causes the first assembly 125 to move in the opposite direction of the linear slide drive motor 18's travel, effectively making first assembly 125 remain stationary with respect to charging port 131, while the second assembly 112 moves linearly toward the charging port 131 at twice the linear speed of the linear slide drive motor 18.

Overall, electric vehicle plug in operation can be as follows. After charging robot 501 has located itself next to charging port 131 of the electric vehicle using its wheel drive system and various optical and ultrasonic sensors, charging robot 501 uses computer vision camera 70 to align charging nozzle assembly 401 in X, Y, and Z axes with charging port 131. Charging robot 501 may use a combination of the wheels 511 of base 503, the jack screw 523 in the mast 507 and the elbow motor 527, as well as rotation motor 16 as it moves close enough to enable charging nozzle assembly 401 to insert itself into charging port 131 using the linear slide drive motor 18. This first engagement position of the plug in sequence is shown in FIG. 22 and FIG. 23.

Once the charging nozzle assembly 401 is properly aligned with charging port 131 of the electric vehicle, linear slide drive motor 18 engages and starts moving charging nozzle assembly 401 into charging port 131. The combined swivel ring 840 with rollers 13 follow track shape 871 which in turns rotates the combined swivel ring 840 around axis 901 and extends the second nozzle assembly 60 into charging port 131 until it is fully seated and locking pawl cavity 875 is situated above locking pawl 81. First nozzle assembly 40 stays mostly in a fixed location because of the geometric relationship between track shapes 871 and the dimensional geometry of combined swivel ring 840. At this time, the spring load from compression spring 55 on proximity pin 56 forces light engagement of proximity pin 56 with inlet proximity pin 82 in charging port 131 ensuring there is electrical contact between proximity pin 56 and inlet proximity pin 82. This second engagement position of the plug sequence is shown in FIG. 24 and FIG. 25.

Once the second nozzle assembly 60 is fully seated, the geometry of track shapes 871 combined with the geometry of combined swivel ring 840 as described in above keeps second nozzle assembly 60 fixed in place as related to charging port 131, and the first nozzle assembly 40 is forced to move linearly into charging port 131.

As soon as the ground pin 38 touches inlet ground pin 84 inside charging port 131, the electric vehicle can measure a fixed resistance between inlet ground pin 84 and inlet proximity pin 82 indicating to the electric vehicle that the charging nozzle assembly 401 is fully seated. In response to the indication, the electric vehicle engages locking pawl 81 upward to engage with locking pawl cavity 875 at the bottom of second nozzle assembly 60 thereby locking second nozzle assembly 60 firmly to the electric vehicle. Locking the second nozzle assembly 60 to the electric vehicle implies that entire nozzle arm assembly 201 is attached to the electric vehicle. This third engagement position in the plug sequence is shown in FIG. 26.

At this point the frictional resistance that needs to be overcome to insert first nozzle assembly 40 into charging port 131 is high. However, since the electric vehicle has already engaged the locking pawl 81, the counterforce for linear slide drive motor 18 is pushing against this locking pawl 81 and the first nozzle assembly 40 can be therefore inserted completely until it is fully seated into the bottom of charging port 131. When first nozzle assembly 40 is fully inserted into charging port 131, charging pins 36 and 38 are engaged with corresponding inlet charging female pin 80 and 84. This fourth engagement position is shown in FIG. 27 and FIG. 28.

Figure 29:
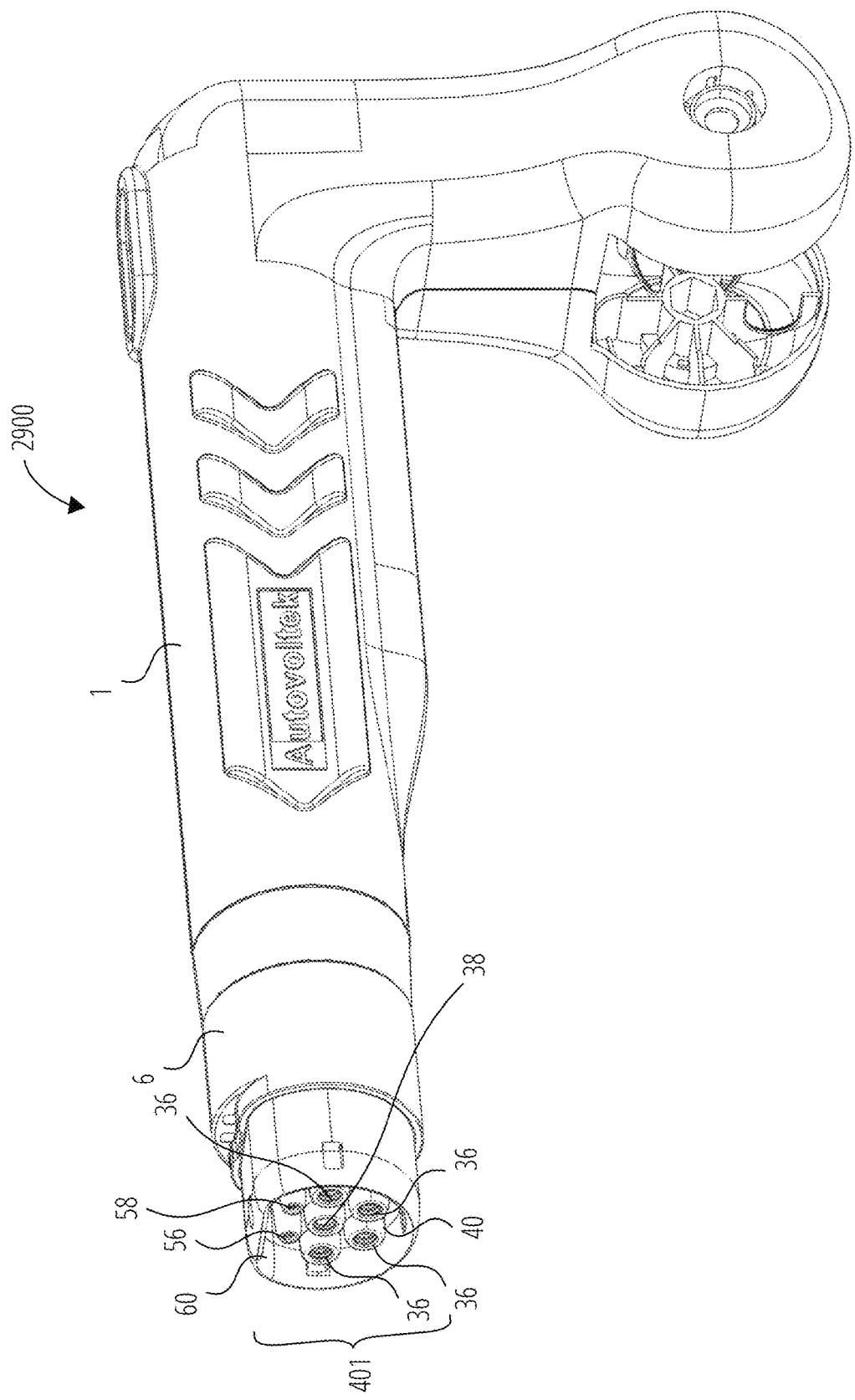
FIG. 29 is a perspective view of nozzle arm assembly of the charging robot of FIG. 1, according to an example embodiment.

FIG. 29 is a perspective view of a nozzle arm assembly 2900 of the charging robot 501 of FIG. 1, according to an example embodiment. Nozzle arm assembly 2900 can be used with Mennekes Type 2 charging port. The nozzle arm assembly 2900 includes a charging nozzle assembly 401, a first nozzle assembly 40, a second nozzle assembly 60, a housing 1, and a nozzle sleeve 6. First nozzle assembly 40 includes a ground pin 38 and a charging pins 36. Second nozzle assembly 60 includes communication pin 58 and a proximity pin 56.

Figure 30:
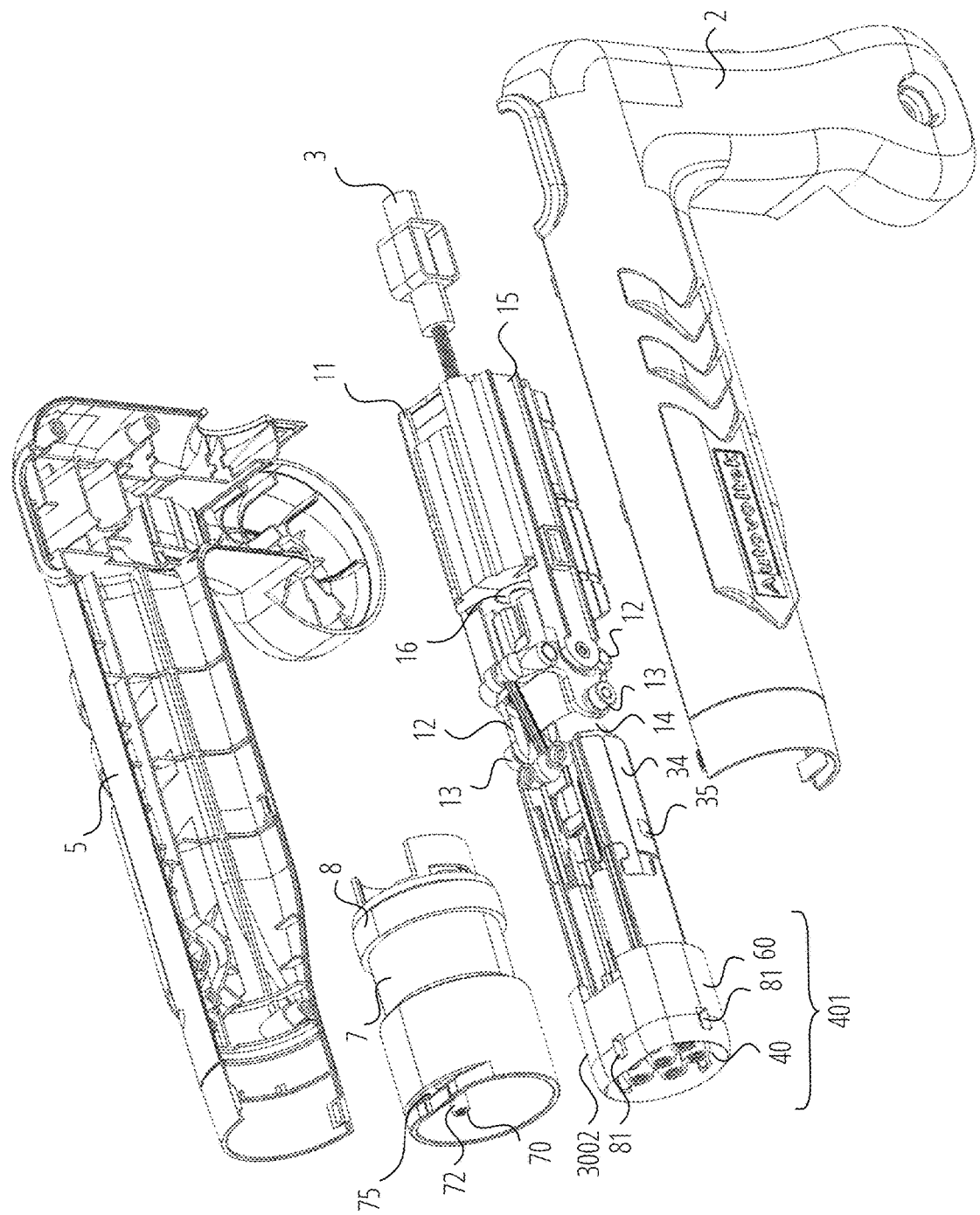
FIG. 30 is a partially exploded view of the nozzle arm assembly of FIG. 29, according to an example embodiment.

FIG. 30 is a partially exploded view of nozzle arm assembly 2900 of FIG. 29, according to an example embodiment. FIG. 30 depicts the following components: a charging nozzle assembly 401, a first nozzle assembly 40, a second nozzle assembly 60, a rotation motor 16, a housing half 5, a housing half 2, a linear drive nut holder 3, a rubber ring mount 8, an axial slide housing half 11, swivel ring halves 12, a rotation adapter sleeve 14, a camera holder 72, an LED light printed circuit board 75, a pin pusher 35, a first nozzle pusher 34, rollers 13, an axial slide housing half 15, a nozzle bearing ring 7, and a computer vision camera 70.

Unlike the second nozzle assembly, in nozzle arm assembly 201, second nozzle assembly 60 of nozzle arm assembly 201 includes a casing 3002. Casing 3002 can move inside Mennekes Type 2 charging port. Multiple locking pawl cavity 875 can be arranged around casing 3002 to receive locking pawls.

Figure 31:
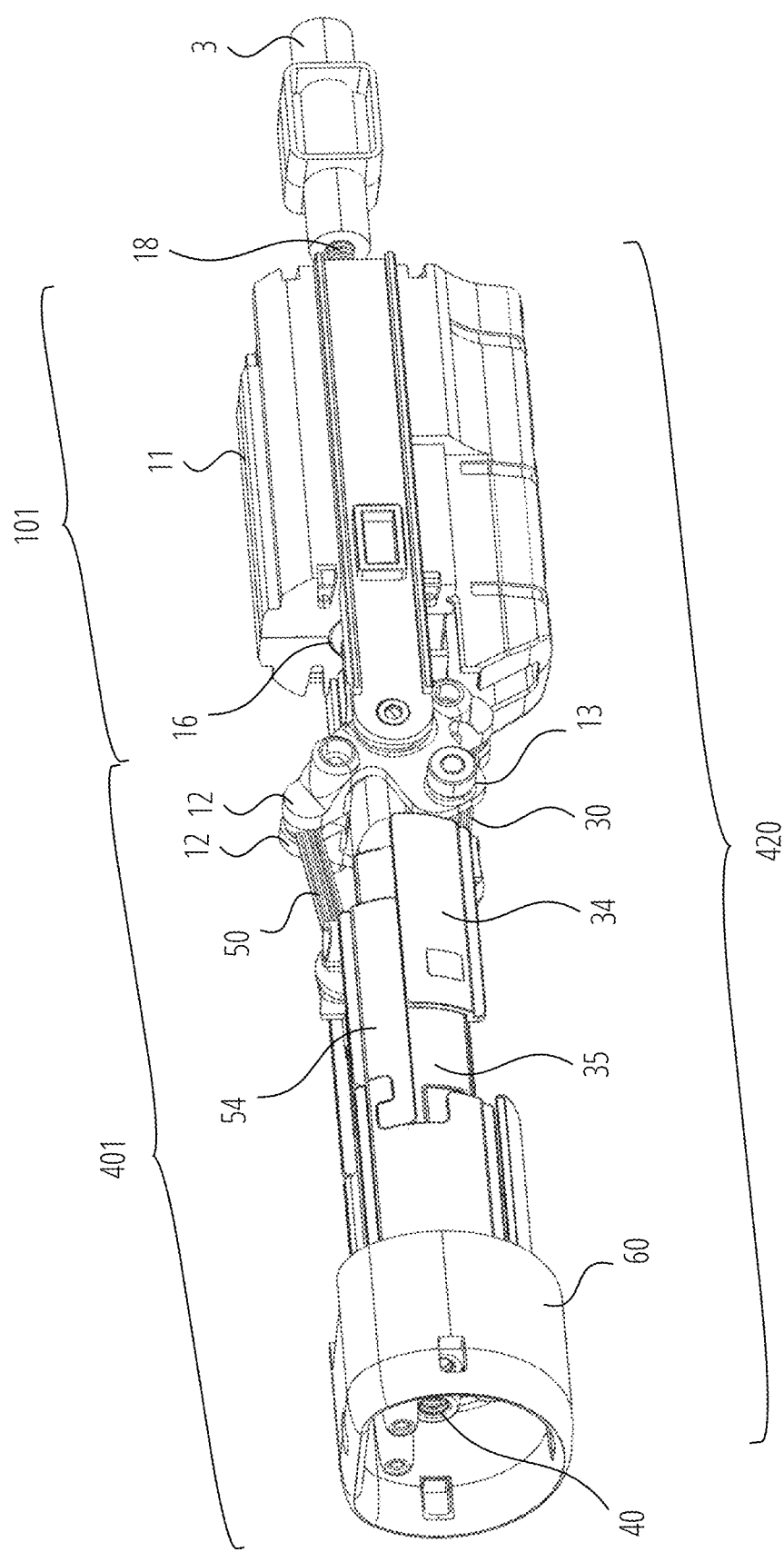
FIG. 31 is a left side perspective view of a mechanical assembly disposed inside the nozzle arm assembly of FIG. 29, according to an example embodiment.

FIG. 31 is a left side perspective view of the mechanical assembly 420 disposed inside nozzle arm assembly 2900 of FIG. 29, according to an example embodiment. Mechanical assembly 420 includes a charging nozzle assembly 401 and a linear sliding assembly 101.

Charging nozzle assembly 401 includes a first nozzle assembly 40, a second nozzle assembly 60, a pin pusher 35, a first nozzle pusher 34, a second nozzle pusher 54, rollers 13, a double ball joint tie rod 30, and a double ball joint tie rod 50. In the example embodiment shown in FIG. 31, second nozzle assembly 60 is advanced with respect to first nozzle assembly 40.

Linear sliding assembly 101 includes a rotation motor 16, a linear slide drive motor 18, a linear drive nut holder 3, an axial slide housing half 11, an axial slide housing half 15, and swivel ring halves 12.

Figure 32:
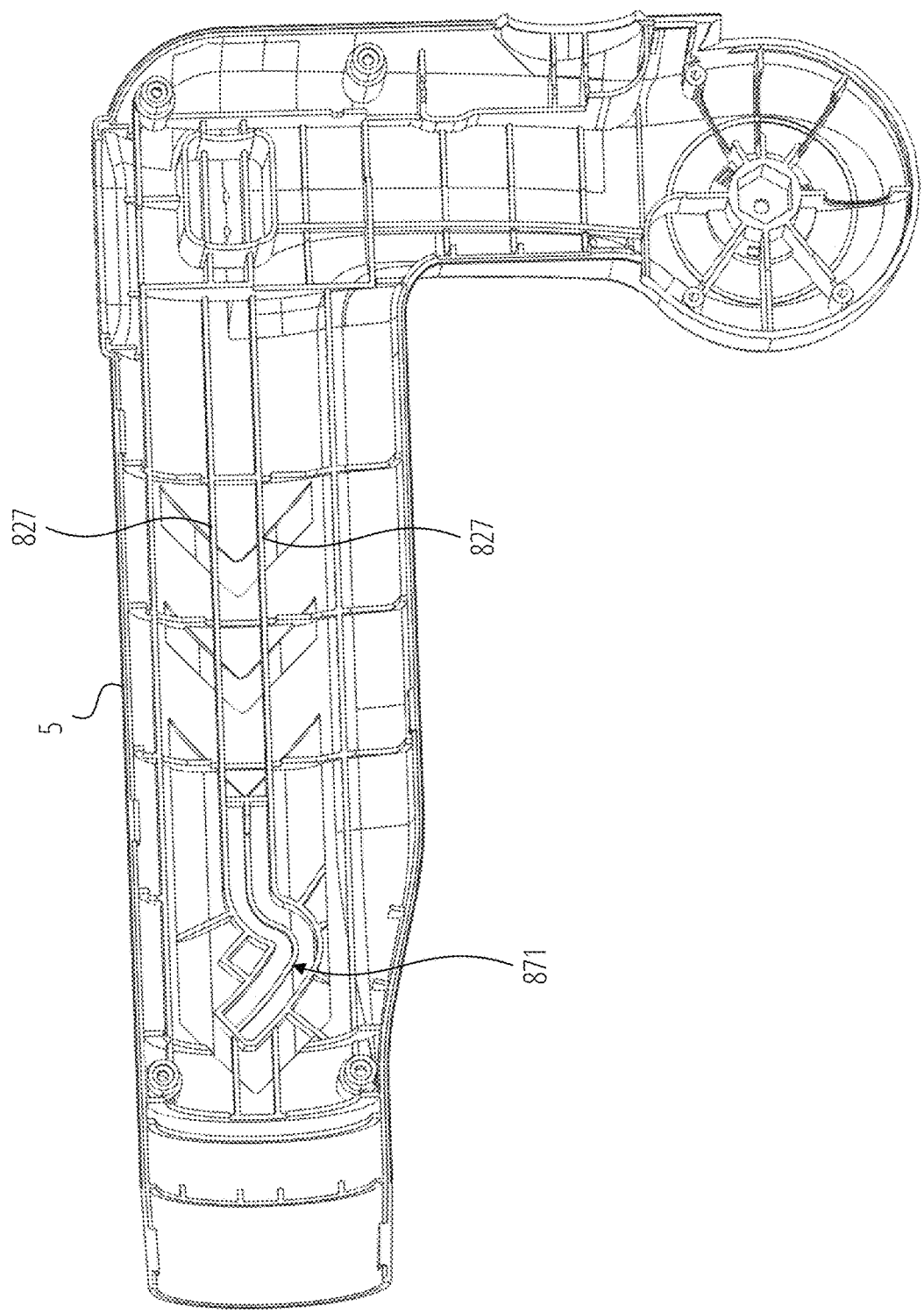
FIG. 32 is a perspective view of a housing half of the nozzle arm assembly of FIG. 29, according to an example embodiment.

FIG. 32 is a perspective view of a housing half 5 of the nozzle arm assembly 2900 of FIG. 29, according to an example embodiment. Housing half 5 includes a track shape 871 and longitudinal ribs 827. Track shape 871 is designed to receive roller 13 (shown in FIG. 31).

Figure 33:
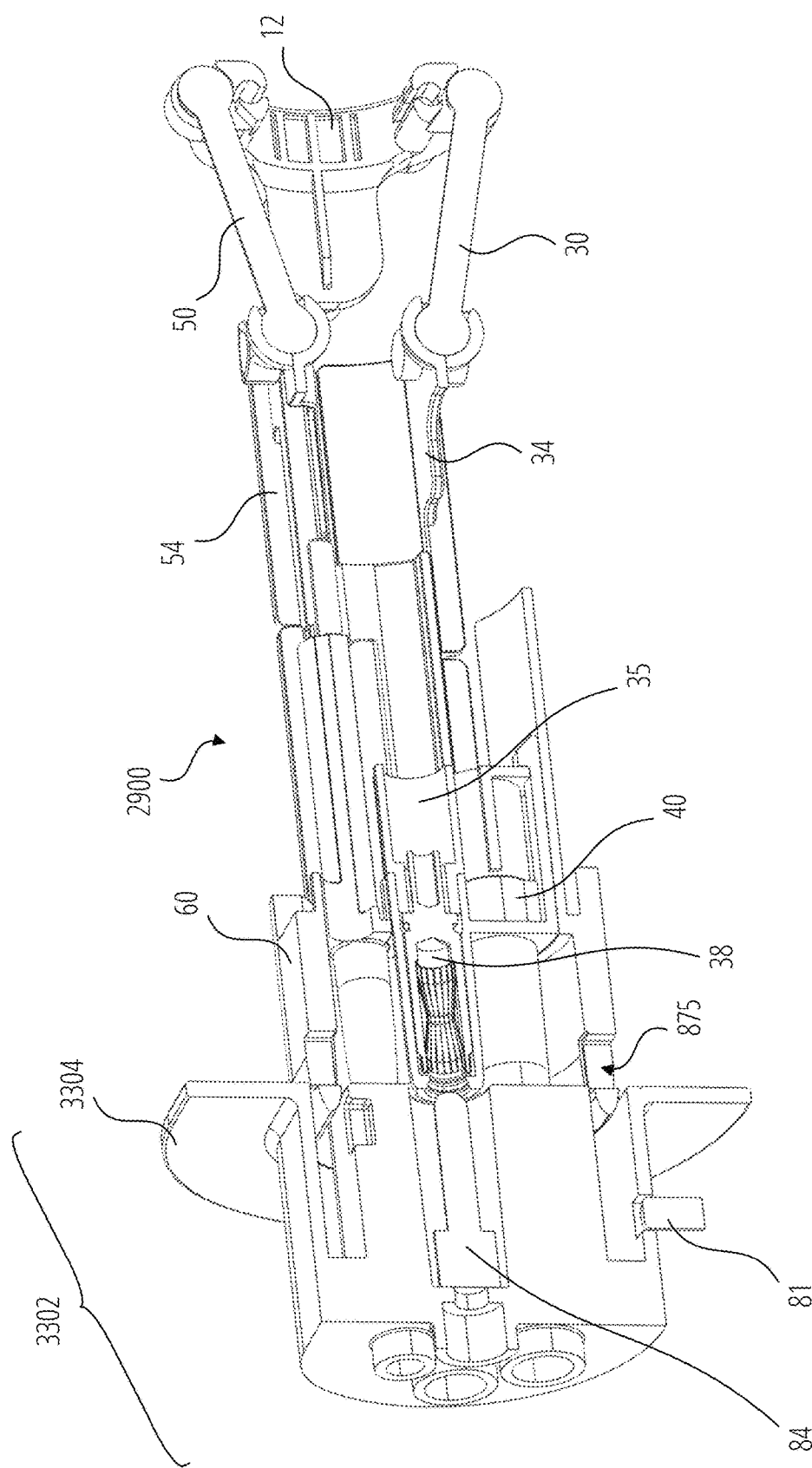
FIG. 33 is a perspective sectional view of the nozzle arm assembly of FIG. 29 and a charging port situated along a plane at the first engagement position, according to an example embodiment.

FIG. 33 is a perspective sectional view of nozzle arm assembly 2900 and charging port 3302 along a plane at the first engagement position, according to an example embodiment. FIG. 33 depicts the following elements of nozzle arm assembly 2900: a first nozzle assembly 40, a second nozzle assembly 60, a swivel ring half 12, a pin pusher 35, a first nozzle pusher 34, a double ball joint tie rod 50, a second nozzle pusher 54, a double ball joint tie rod 30, a ground pin 38, a locking pawl cavity 875, a locking pawl 81. Charging port 3302 can be a Mennekes Type 2 charging port. Charging port 3302 may include inlet socket housing 3304 and inlet ground pin 84.

In the first engagement position the edge of second nozzle assembly 60 is aligned with the edge of first nozzle assembly 40. Both the second nozzle assembly 60 and first nozzle assembly 40 are lining up with charging port 3302. Inlet ground pin 84 of charging port 3302 is not engaged with ground pin 38 of second nozzle assembly 60. Double ball joint tie rod 50 and double ball joint tie rod 30 are symmetrical with respect to the longitudinal axis of nozzle arm assembly 2900. Swivel ring half 12 is orthogonal to the longitudinal axis of nozzle arm assembly 2900.

The further steps of the engagement between nozzle arm assembly 2900 and charging port 3302 can proceed as follows. When rollers 13 move along track shape 871 (shown in FIG. 29), second nozzle assembly 60 is pushed by second nozzle pusher 54 until second nozzle assembly 60 is fully inserted into charging port 3302 (the second engagement position). In the second engagement position, first nozzle assembly 40 is not fully inserted into charging port 3302 and inlet ground pin 84 of charging port 3302 is not engaged with ground pin 38 of second nozzle assembly 60.

First nozzle assembly 40 is then pushed by first nozzle pusher 34 into the third engagement position. In the third engagement position, with first nozzle assembly 40 still not fully inserted into charging port 3302, inlet ground pin 84 of charging port 3302 engages ground pin 38 of second nozzle assembly 60. Once ground pin 38 engages inlet ground pin 84, locking pawl 81 is inserted into locking pawl cavity 875 to secure second nozzle assembly 60 inside charging port 131.

After second nozzle assembly 60 is secured inside charging port 131, first nozzle assembly 40 continues to advance inside charging port 131 until it reaches the fourth engagement position. In the fourth engagement position, first nozzle assembly 40 is fully inserted into charging port 3302, thereby allowing charging pins 36 (shown in FIG. 29) to engage the corresponding inlet charging pins of charging port 3302.

Figure 34:
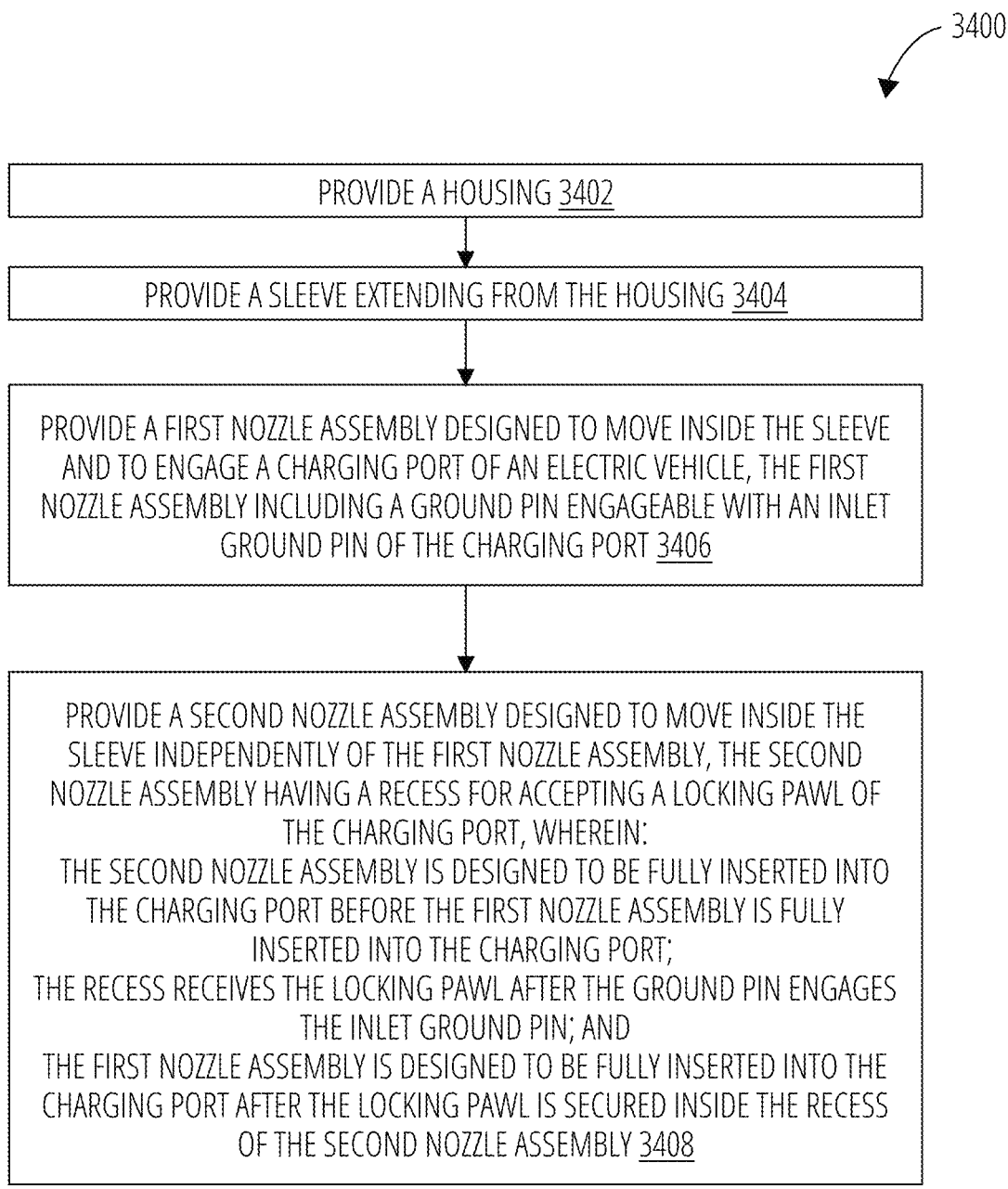
FIG. 34 illustrates a method for manufacturing an apparatus for charging electrical vehicles, according to an example embodiment.

FIG. 34 illustrates a method 3400 for manufacturing an apparatus for charging electrical vehicles, according to an example embodiment of the present disclosure. In other embodiments, the operations of method 3400 may be combined, performed in parallel, or performed in a different order. Method 3400 may also include additional or fewer operations than those illustrated.

In block 3402, method 3400 may include providing a housing. The housing may include a first housing half and a second housing half. In block 3404, method 3400 may include providing a sleeve extending from the housing. In block 3406, method 3400 may include providing a first nozzle assembly designed to move inside the sleeve and to engage a charging port of an electric vehicle. The first nozzle assembly may include a ground pin, a first charging pin, and a second charging pin for establishing a connection with the charging port. The ground pin is engageable with an inlet ground pin of the charging port. The first nozzle assembly may include a first cavity designed to receive the first charging pin, a second cavity designed to receive the second charging pin, and a third cavity designed to receive the ground pin.

In block 3408, method 3400 may include providing a second nozzle assembly designed to move inside the sleeve independently of the first nozzle assembly. The second nozzle assembly may have a recess for receiving a locking pawl of the charging port. The second nozzle assembly may include a proximity pin and a communication pin for engaging with the charging port. The second nozzle assembly can be designed to be fully inserted into the charging port before the first nozzle assembly is fully inserted into the charging port. The recess of the second nozzle assembly may receive the locking pawl after the ground pin of the first nozzle assembly engages the inlet ground pin of the charging port. The first nozzle assembly can be designed to be fully inserted into the charging port after the locking pawl is secured inside the recess of the second nozzle assembly. The second nozzle assembly and the first nozzle assembly can be designed to rotate with the sleeve about an axis of rotation of the sleeve.

The apparatus may include a camera holder disposed inside the sleeve and restricted from moving along the sleeve and a computer vision camera mounted onto the camera holder. The apparatus may include a first connector pusher designed to move the first nozzle assembly inside the sleeve and a second connector pusher designed to move the second nozzle assembly inside the sleeve. The apparatus may include a first tie rod connected to the first connector pusher via a first ball joint and a second tie rod connected to the second connector pusher via a second ball joint. The apparatus may include a swivel ring engaging the first tie rod and the second tie rod. A rotation of the swivel ring in a first direction causes the second connector pusher to move inside the sleeve, thereby moving the second nozzle assembly towards the charging port. After the locking pawl is secured inside the recess of the second nozzle assembly, a rotation of the swivel ring in a second direction causes the first connector pusher to move inside the sleeve, thereby moving the first nozzle assembly towards the charging port.

The swivel ring can be designed to rotate around an axis of the sleeve and around a further axis, the further axis being orthogonal to the axis of the sleeve. The swivel ring may include a first swivel ring half and a second swivel ring half.

Thus, systems and methods and apparatus for charging electrical vehicles have been described. Although embodiments have been described with reference to specific example embodiments, it will be evident that various modifications and changes can be made to these example embodiments without departing from the broader spirit and scope of the present application. Accordingly, the specification and drawings are to be regarded in an example rather than a restrictive sense.

What is claimed is:

1. An apparatus comprising:
a housing;
a sleeve extending from the housing;
a first nozzle assembly designed to move inside the sleeve and to engage a charging port of an electric vehicle, the first nozzle assembly including a ground pin engageable with an inlet ground pin of the charging port; and
a second nozzle assembly designed to move inside the sleeve independently of the first nozzle assembly, the second nozzle assembly having a recess for receiving a locking pawl of the charging port, wherein:
the second nozzle assembly is designed to be fully inserted into the charging port before the first nozzle assembly is fully inserted into the charging port;
the recess receives the locking pawl after the ground pin engages the inlet ground pin; and
the first nozzle assembly is designed to be fully inserted into the charging port after the locking pawl is secured inside the recess of the second nozzle assembly.

2. The apparatus of claim 1, wherein:
the first nozzle assembly includes a first charging pin and a second charging pin for establishing a connection with the charging port; and
the second nozzle assembly includes a proximity pin and a communication pin for engaging with the charging port.

3. The apparatus of claim 2, wherein the first nozzle assembly includes:
a first cavity designed to receive the first charging pin;
a second cavity designed to receive the second charging pin; and
a third cavity designed to receive the ground pin.

4. The apparatus of claim 1, wherein the second nozzle assembly and the first nozzle assembly are designed to rotate with the sleeve about an axis of rotation of the sleeve.

5. The apparatus of claim 1, further comprising:
a camera holder disposed inside the sleeve and restricted from moving along the sleeve; and
a computer vision camera mounted onto the camera holder.

6. The apparatus of claim 1, further comprising:
a first connector pusher designed to move the first nozzle assembly inside the sleeve;
a second connector pusher designed to move the second nozzle assembly inside the sleeve;
a first tie rod connected to the first connector pusher via a first ball joint;
a second tie rod connected to the second connector pusher via a second ball joint; and
a swivel ring engaging the first tie rod and the second tie rod, wherein a rotation of the swivel ring in a first direction causes the second connector pusher to move inside the sleeve, thereby moving the second nozzle assembly towards the charging port.

7. The apparatus of claim 6, wherein after the locking pawl is secured inside the recess of the second nozzle assembly, a rotation of the swivel ring in a second direction causes the first connector pusher to move inside the sleeve, thereby moving the first nozzle assembly towards the charging port.

8. The apparatus of claim 6, wherein the swivel ring is designed to rotate:
around an axis of the sleeve; and
around a further axis, the further axis being orthogonal to the axis of the sleeve.

9. The apparatus of claim 6, wherein the swivel ring includes a first swivel ring half and a second swivel ring half.

10. The apparatus of claim 1, wherein the housing includes a first housing half and a second housing half.

11. A method comprising:
providing a housing;
providing a sleeve extending from the housing;
providing a first nozzle assembly designed to move inside the sleeve and to engage a charging port of an electric vehicle, the first nozzle assembly including a ground pin engageable with an inlet ground pin of the charging port; and
providing a second nozzle assembly designed to move inside the sleeve independently of the first nozzle assembly, the second nozzle assembly having a recess for receiving a locking pawl of the charging port, wherein:
the second nozzle assembly is designed to be fully inserted into the charging port before the first nozzle assembly is fully inserted into the charging port;
the recess receives the locking pawl after the ground pin engages the inlet ground pin; and
the first nozzle assembly is designed to be fully inserted into the charging port after the locking pawl is secured inside the recess of the second nozzle assembly.

12. The method of claim 11, wherein:
the first nozzle assembly includes a first charging pin and a second charging pin for establishing a connection with the charging port; and
the second nozzle assembly includes a proximity pin and a communication pin for engaging with the charging port.

13. The method of claim 12, wherein the first nozzle assembly includes:
a first cavity designed to receive the first charging pin;
a second cavity designed to receive the second charging pin; and
a third cavity designed to receive the ground pin.

14. The method of claim 11, wherein the second nozzle assembly and the first nozzle assembly are designed to rotate with the sleeve about an axis of rotation of the sleeve.

15. The method of claim 11, further comprising:
a camera holder disposed inside the sleeve and restricted from moving along the sleeve; and
a computer vision camera mounted onto the camera holder.

16. The method of claim 11, further comprising:
providing a first connector pusher designed to move the first nozzle assembly inside the sleeve;
providing a second connector pusher designed to move the second nozzle assembly inside the sleeve;
providing a first tie rod connected to the first connector pusher via a first ball joint;
providing a second tie rod connected to the second connector pusher via a second ball joint; and
providing a swivel ring engaging the first tie rod and the second tie rod, wherein a rotation of the swivel ring in a first direction causes the second connector pusher to move inside the sleeve, thereby moving the second nozzle assembly towards the charging port.

17. The method of claim 16, wherein after the locking pawl is secured inside the recess of the second nozzle assembly, a rotation of the swivel ring in a second direction causes the first connector pusher to move inside the sleeve, thereby moving the first nozzle assembly towards the charging port.

18. The method of claim 16, wherein the swivel ring is designed to rotate:
   around an axis of the sleeve; and
   around a further axis, the further axis being orthogonal to the axis of the sleeve.

19. The method of claim 16, wherein the swivel ring includes a first swivel ring half and a second swivel ring half.

20. The method of claim 11, wherein the housing includes a first housing half and a second housing half.

\* \* \* \* \*